(12) United States Patent
Lubianiker et al.

(10) Patent No.: US 8,810,879 B2
(45) Date of Patent: Aug. 19, 2014

(54) GIMBALED SCANNING MICRO-MIRROR APPARATUS

(75) Inventors: Yoram Lubianiker, Tel-Aviv (IL); Raviv Erlich, Rehovot (IL); Matan Naftali, Yoqenam (IL); Adi Baram, Yoqneam (IL)

(73) Assignee: Maradin Technologies Ltd., Yoqneam (IL)

( * ) Notice: Subject to any disclaimer, the term of this patent is extended or adjusted under 35 U.S.C. 154(b) by 327 days.

(21) Appl. No.: 12/958,808

(22) Filed: Dec. 2, 2010
(Under 37 CFR 1.47)

(65) Prior Publication Data

US 2011/0228367 A1     Sep. 22, 2011

Related U.S. Application Data

(63) Continuation-in-part of application No. PCT/IL2008/000743, filed on Jun. 2, 2008.

(51) Int. Cl.
*G02B 26/08* (2006.01)

(52) U.S. Cl.
USPC ................................... 359/199.1; 359/221.2

(58) Field of Classification Search
None
See application file for complete search history.

(56) References Cited

U.S. PATENT DOCUMENTS

| | | | |
|---|---|---|---|
| 4,003,626 A | 1/1977 | Reinke et al. | |
| 6,044,705 A | 4/2000 | Neukermans et al. | |
| 6,140,979 A | 10/2000 | Gerhard et al. | |
| 6,181,460 B1 | 1/2001 | Tran et al. | |
| 6,295,154 B1 | 9/2001 | Laor et al. | |
| 6,480,320 B2 | 11/2002 | Nasiri | |
| 6,595,055 B1* | 7/2003 | Schenk et al. | 73/514.15 |
| 6,744,173 B2 | 6/2004 | Behin et al. | |
| 6,760,144 B2 | 7/2004 | Hill et al. | |
| 7,071,594 B1 | 7/2006 | Yan et al. | |
| 2003/0019832 A1 | 1/2003 | Conant et al. | |
| 2004/0004749 A1 | 1/2004 | Orcutt et al. | |
| 2004/0100679 A1* | 5/2004 | Kuo | 359/291 |
| 2004/0136041 A1 | 7/2004 | Togino | |
| 2004/0207744 A1 | 10/2004 | Bock | |
| 2004/0223195 A1* | 11/2004 | Nomura | 358/509 |
| 2005/0078345 A1 | 4/2005 | Turner et al. | |
| 2005/0082252 A1 | 4/2005 | Nasiri et al. | |
| 2005/0128609 A1 | 6/2005 | Shimada et al. | |
| 2005/0243446 A1 | 11/2005 | Wood | |
| 2008/0055815 A1* | 3/2008 | Rottenberg | 361/278 |
| 2008/0094682 A1* | 4/2008 | Greywall et al. | 359/245 |

(Continued)

FOREIGN PATENT DOCUMENTS

WO     2006051544 A2     5/2006

OTHER PUBLICATIONS

Wolter et al., "Improved layout for a resonant 2D Micro Scanning Mirror with low operation voltages", Proceedings of SPIE, (2003), vol. 4985, pp. 72-82.

(Continued)

*Primary Examiner* — Stephone B Allen
*Assistant Examiner* — Jyotsna Dabbi
(74) *Attorney, Agent, or Firm* — Nath, Goldberg & Meyer; Jerald L. Meyer

(57) ABSTRACT

Provided is a Micro-Electro-Mechanical Systems (MEMS) device for actuating a gimbaled element, the device including a symmetric electromagnetic actuator for actuating one degree of freedom (DOF) and a symmetric electrostatic actuator for actuating the second degree of freedom.

17 Claims, 28 Drawing Sheets

(56) References Cited

U.S. PATENT DOCUMENTS

| | | | |
|---|---|---|---|
| 2008/0197748 A1* | 8/2008 | Naftali et al. | 310/309 |
| 2009/0058562 A1* | 3/2009 | Joodaki | 333/208 |
| 2010/0020379 A1 | 1/2010 | Lubianiker | |
| 2011/0228367 A1 | 9/2011 | Lubianiker et al. | |

OTHER PUBLICATIONS

Sprague et al., "Bi-axial magnetic drive for Scanned Beam Display mirrors", Proceedings of SPIE, (2005), vol. 5721, pp. 1-13.

Ji et al., "Dual-Axis Electromagnetic Scanning Micromirror Using Radial Magnetic Field", MEMS 2006, Istanbul, Turkey, (2006), pp. 32-35.

Kwon et al., "Vertical Combdrive Based 2-D Gimbaled Micromirrors with Large Static Rotation by Backside Island Isolation", IEEE Journal of Selected Topics in Quantum Electronics, (2004), vol. 10, No. 3, pp. 498-504.

Leus et al., "Fringing Field Effect in Electrostatic Actuators", Technical Report ETR-2004-2, Technion—Israel Institute of Technology, Faculty of Mechanical Engineering, (2004), pp. 1-15.

Urey et al., "Optical performance requirements for MEMS-scanner based microdisplays", Conf. on MOEMS and Miniaturized Systems, SPIE, (2000), vol. 4178, pp. 176-185.

Timoshenko et al., "Theory of Elasticity", (1970), 3rd ed., London, McGraw-Hill International, ten (10) pages.

Madou, "Fundamentals of Micro fabrication", (2000), 2nd ed., CRC, Table of Contents, nine (9) pages, pp. 535-614.

Muhlstein et al., "High-Cycle Fatigue of Single-Crystal Silicon Thin Films", Journal of Microelectromechanical Systems, (2001), vol. 10, No. 4, pp. 593-600.

HyperPhysics Concepts, six (6) pages, http://hyperphysics.phy-astr.gsu.edu/hbase/hph.html.

Jenkins et al., "Fundamentals of Optics", (1976), 4th ed., McGraw-Hill Book Company, fifteen (15) pages.

Hecht, "Optics", (1998), 3rd ed., Addison Wesley, ten (10) pages.

Ray, "Applied Photographic Optics", (1997), 2nd ed., Focal Press, six (6) pages.

"Applied Optics and Optical Engineering", (1965), vol. III, edited by Rudolf Kingslake, Academic Press, thirty-six (36) pages.

\* cited by examiner

| Scenario | t [um] | w [um] | L [um] | J spring [Kg*m$^2$] | K [N*m] | f [KHz] |
|---|---|---|---|---|---|---|
| Mirror designed freq | 45 | 23 | 505 | 1.239E-19 | 3.87E-11 | 10.41906 |
| size -0.5um | 45 | 22.5 | 505 | 1.172E-19 | 3.66E-11 | 10.13152 |

FIG. 18

| Position Number | Real Space X Coordinate | Real Space Y Coordinate | MEMS X angle | MEMS Y angle |
|---|---|---|---|---|
| 1 | 0 | 0 | 0 | 0 |
| 2 | 180 | 0 | -10.52 | -0.635 |
| 3 | -180 | 0 | 10.52 | -0.635 |
| 4 | 0 | 135 | 0 | 7.555 |
| 5 | 0 | -135 | 0 | -7.555 |
| 6 | 180 | 135 | -10.78 | 6.703 |
| 7 | 180 | -135 | -9.808 | 7.915 |
| 8 | -180 | 135 | 10.78 | 6.703 |
| 9 | -180 | -135 | 9.808 | -7.915 | ps competitive to other display technologies.
GIMBALED SCANNING MICRO-MIRROR APPARATUS This is a continuation-in-part application of PCT/IL2008/000743, filed on Jun. 2, 2008, the content of which is hereby incorporated by reference in its entirety.

FIELD OF THE INVENTION

The present invention relates to the field of micro-electromechanical systems (MEMS) and more particularly to electromagnetic and electrostatic actuators therefor.

BACKGROUND OF THE INVENTION

State of the art MEMS systems and related technologies are described in the following publications and documents:
1. U.S. Pat. No. 6,595,055
2. Wolter A. et al., "Improved layout for a resonant 2D microscanning mirror with low operation voltages", Proc. of SPIE Vol. 4985, pp. 72-82, 2003
3. Randy Sprague, Tom Montague, Dean Brown, "Bi-axial magnetic drive for Scanned Beam Display mirrors", Proc. of SPIE Vol. 5721, pp. 1-13, 2005
4. Chang-Hyeon Ji, Si-Hong Ahn, Ki-Chang Song, Hyoung-Kil Yoon, Moongoo Choi Sang-Cheon Kim, and Jong-Uk Bu, "Dual-axis electro-magnetic scanning micromirror using radial magnetic field", presented at MEMS '06, Istanbul, Turkey, 2006
5. Sunghoon Kwon, Veljko Milanovic and Luke P. Lee "Vertical Comb-drive Based 2-D Gimbaled Micromirrors With Large Static Rotation by Backside Island Isolation", J. Selected topics in quantum elec., Vol 10(3), pp. 498-504, 2004
6. U.S. Pat. No. 6,140,979
7. V. Leus, D. Elata, Fringing Field Effect in Electrostatic Actuators, ETR-2004-2, 2004 (a technical document associated with the Technion, Haifa, Israel, available on Internet).
8. Hakan et al., Optical performance requirements for MEMS-scanner based micro displays, SPIE Vol. 4178, p. 176-185, 2000
9. S. P. Timoshenko and J. N. Goodier, Theory of elasticity, 3rd ed. London: McGraw-Hill International, 1970.
10. Marc J. Madou, *Fundamentals of Micro fabrication*, 2$^{nd}$ Edition, CRC Press, 2000, ISBN: 0849308267
11. L. Muhlshtein et. al., High cycle fatigue of single crystal Si thin films, JMEMS Vol. 10, December 2001
12. The following http link: hyperphysics.phy-astr.gsu.ed.
13. PCT/IL2005/001194 to Elop Electro-optical Industries Ltd. (WO 2006/051544)
14. Published US Application No. 2005/0243446 to Wood
15. U.S. Pat. No. 6,595,055 to Schenk et al
16. U.S. Pat. No. 6,140,979 to Gerhard et al
17. U.S. Pat. No. 7,071,594 to Yan et al.

The disclosures of all publications and patent documents mentioned in the specification, and of the publications and patent documents cited therein directly or indirectly, are hereby incorporated by reference.

SUMMARY OF CERTAIN EMBODIMENTS OF THE INVENTION

Many MEMS applications require tilting motion of reflecting surfaces (i.e., micro-mirrors). In particular, there are applications with the need for tilting motions in two directions simultaneously, i.e., a mechanism having two degrees-of-freedom (DOF). One such application is a scanning micro-mirror device for the use of displaying images.

Micro-mirrors offer numerous advantages in realizing optical scanning systems. Their small size, low cost and low power consumption provide a compelling solution for image creation and display systems. However, state-of-the-art designs still fall short on achieving the required performance (i.e., resolution, scan range, repeatability, scan linearity and power) which is required to make micro-mirrors based displays competitive to other display technologies.

The actuation of micro-mirrors in two degrees of freedom is useful for the functionality of the device. One way to implement actuation of an element in two degrees of freedom is with two different elements, each of which moves simultaneously in orthogonal directions. One way to implement actuation of an element in two degrees of freedom is by actuating a single gimbaled element having two degrees of freedom. The preferred architecture for micro-mirror scanners is the gimbaled design, where a single mirror is manipulated across two degrees of freedom. This architecture utilizes only one mirror for the two dimensional scan, thus reducing the chip size and simplifying the optical system design. The mirror is manipulated across both axes by using an actuation mechanism. The scan across one axis (horizontal axis) is done at a relatively high frequency, typically a few KHz, while the scan across the second axis (vertical axis) is done at a relatively lower frequency, typically a few tens of Hz.

The prevalent actuation mechanisms are:
a) Electrostatic, e.g. as shown in prior art FIG. 2, where capacitance change induces an electrostatic force to move the mirror about an axis. Typically, comb drive actuators are used to create this movement.
b) Electromagnetic, e.g. as shown in prior art FIG. 3, where alternating current in a magnetic field induces a magnetic force to move the mirror. Most commonly, the mirror has current carrying coils, and is positioned inside a magnetic flux created by fixed magnets which are placed beside the mirror and coil unit.
c) Piezoelectric, where a piezoelectric material is used to translate voltage into mechanical force and consequently, mirror movement.

Reference is made to FIG. 2 (Prior art), which illustrates a typical prior art electrostatic actuation mechanism 100. A mirror 110 is affixed to moving element 120 (rotor) having an axis 122. Two electrodes 130*a* and 130*b* (stator) are placed below each end of element 120. When an electrical potential difference is introduced between element 120 and an electrode 130*a*, a force F is created, attracting element 120 to electrode 130*a*, thereby creating a movement of element 120 about axis 122. When movement is required in the opposite direction, an electrical potential difference is introduced between element 120 and the other electrode 130*b*. The electrostatic actuation mechanism 100 also creates a force f on axis 122, which typically, in MEMS technology, is flexible, thus creating an unwarranted movement of axis 122 in the direction of force f. The unwarranted movement of axis 122 is a result of the electrostatic actuator 100 being non-symmetric. Furthermore, the usage of electrostatic actuators 100 in two degrees of freedom introduces more problems. Typically, micro-mirrors 110 are designed to operate at their resonant frequency (i.e. the frequency at which the mechanical structure oscillates). However, the scan linearity (in the horizontal axis) in display applications is greatly affected, which causes pixel and thereby image blurring. Moreover, in much of the prior art, a single actuator is used to excite motion in both scanning axes. As a result, there is a mechanical coupling of the two degrees of freedom (i.e., actuation of one degree of freedom also induces some residual actuation force on the other degree of freedom), which directly affects the scan linearity and the image sharpness and reduces the elements' operation quality and efficiency. Various solutions have been proposed to this problem; however none provides a suitable solution to the problem of attaining a linear scan at low power consumption. Published U.S. Patent Application 2004223195 to Nomura is an example of a gimbaled mechanism with two degrees of freedom using electrostatic actuators.

Reference is made to FIG. 3 (Prior art), which illustrates a typical prior art electromagnetic actuation mechanism 200, including a magnet 210 and an element 220 which has an axis 222 and is wound with a coil 224. When a DC electric current is introduced into coil 224, a repelling/attracting force 226 is induced relatively to the magnetic field of static magnets 210 and the DC electric current, thereby creating a movement of element 220 about axis 222 in the direction of the repelling/attracting force 226. When movement is required in the opposite direction, the polarity of the alternating electric current introduced into coil 224 is changed, thereby inducing force in the opposite direction.

The main advantage of the electromagnetic actuation is the high force density, resulting in a device that can operate in a protective environment without the need for a vacuum. However, it is not trivial to use electromagnetic actuation for inner gimbaled moving elements. Therefore, it is prevalent to use electrostatic actuation for such elements. A method that can simultaneously actuate a gimbaled element in two degrees of freedom, while using two different actuators, is more robust and less sensitive to mechanical coupling, but is not trivial for implementation.

To overcome the asymmetry of electrostatic actuation mechanism 100, a different, symmetrical electrostatic actuation mechanism was introduced in U.S. Pat. No. 6,595,055 (US '055) to Schenk et al. US '055 provided a scissors-like mechanism that introduced an electrostatic actuation mechanism with a pure torque applied to the axis of movement of the rotor, not giving rise to unwarranted force on the axis of rotation.

Reference is made to FIG. 4 (Prior art), which illustrates a symmetric prior art electrostatic actuation, with scissors-like mechanism 150. A mirror 160 is affixed to moving element 170 (rotor) having an axis 172. Electrostatic actuation mechanism 150 also includes a stator element 180, whereas there is some angle $\theta_0$ between stator 180 and rotor 170, when there is no electrical potential difference between stator 180 and rotor 170, i.e. $V_1(t)=V_2(t)$. When a difference in electrical potential is introduced between stator 180 and rotor 170, a force F is created, attracting rotor 170 to stator 180, thereby creating a movement of rotor 170 about axis 172. In this embodiment no residual forces are applied to axis 172. However the mechanism introduced by US '055 causes manufacturing difficulties as both stator 180 and rotor 170 are created from the same layer of silicon, which raises the problem of applying $V_1(t) \neq V_2(t)$ in the same layer of silicon. US '055 provides a solution, which is difficult to manufacture, where the stator layer includes two additional sub-layers: an insulating sub-layer and a metal layer to which $V_1(t)$ is applied.

A critical parameter in micro-mirror design is the attainable scan angle, which determines the optical system design and resulting size of the display. One of the main limitations in all actuation mechanisms is the maximum attainable scan angle since current or voltage at the micro-mirror are limited.

To provide repeatability and linearity, a feedback mechanism is incorporated in the mirror design. The feedback mechanism however is susceptible to interference from the drive signals which are typically orders of magnitude stronger. Furthermore, the feedback control of existing scanners falls short of the required linearity and repeatability and typically senses one degree of freedom.

Thus, it would be advantageous for applications using micro-mirror architectures to have one or more of the following characteristics:
 a) Eliminating the coupling/interference/crosstalk between the two axes of motion;
 b) Achieving low drive power while maintaining a linear scan;
 c) Increasing available drive force to increase scan angle:
 d) Improving the feedback sensors to increase the resolution; and/or
 e) Optimizing feedback algorithms to provide the required repeatability and linearity.

Certain embodiments of the invention shown and described herein eliminate the mechanical coupling of the two degrees of freedom. Certain embodiments of the invention shown and described herein facilitate simple implementation and sufficient power for high quality performances typically required in such devices.

The term "gimbaled element" as used herein refers to an element with two angular degrees of freedom defining two respective angles, the element being capable of moving about two axes simultaneously, the angles rotating about axes which are substantially mutually orthogonal and coplanar. Reference is made to FIG. 1 (Prior art), which illustrates a gimbaled element 10. Gimbaled element 10 includes an inner element 30 that can rotate about axis 32 and an outer element 20 that can rotate about axis 22, whereas the two axes 22 and 32 provide gimbaled element 10 the two degrees of freedom.

According to certain embodiments of the present invention there is provided a micro-electro-mechanical system (MEMS) device for actuating a gimbaled element. The MEMS device includes an electromagnetic actuator for actuating a first angular degree of freedom (DOF) of rotation about the vertical axis; and an electrostatic actuator for actuating the second angular degree of freedom of rotation about the horizontal axis, wherein the horizontal axis and the vertical axis are orthogonal and coplanar. The electromagnetic actuator has a symmetric structure, thereby actuating forces produced by the electromagnetic actuator, creating only a rotational movement of the first degree of freedom, about the vertical axis. The electromagnetic actuator excites only negligible residual actuation force on the second degree of freedom. The electrostatic actuator uses electrostatic fringing fields, thereby creating an actuation force, and since the electrostatic actuator has a symmetric structure, the actuating forces create only a rotational movement of the second degree of freedom about the horizontal axis. The electrostatic actuator excites only negligible residual actuation force on the first degree of freedom. Both the rotor and the stator of the electrostatic actuator are created from the same layer and there is no electrical potential difference between both sides of the layer of the electrostatic actuator.

The electrostatic actuator actuates the second degree of freedom in the horizontal scan direction and the electromagnetic actuator actuates the first degree of freedom in the vertical scan direction. The electromagnetic actuator includes external fixed electromagnet coils and internal rotating magnets, wherein the rotating magnets are affixed to the vertical axis and actuated by the electromagnet coils. One or more electromagnetic actuators can be used on each side of the vertical axis.

In certain embodiments of the present invention the electrostatic actuator includes a frequency sensor with high signal to noise ratio.

The MEMS device, according to certain embodiments of the present invention, is typically manufactured using a 4-mask Silicon-On-Insulator (SOI) fabrication process.

There is thus provided, in accordance with certain embodiments of the present invention, a micro-electro-mechanical device for actuating a gimbaled element for two-dimensional optical scanning, the device comprising an electromagnetically activated gimbal receiving, and operative in accordance with, a step-wave shaped input signal, an electrostatically actuated, typically resonant mirror mounted on the gimbal and defining two degrees of freedom of motion for the mirror; and a feedback control loop operative to generate feedback data quantifying motion of the mirror and to control the two degrees of freedom of motion of the mirror, based on the feedback data.

Also provided, in accordance with certain embodiments of the present invention, is a method for manufacturing first and second elements with relative electrostatically actuated motion therebetween, the method including providing first and second elements, at least one of which is free to move relative to the other, the first element including first and second mutually isolated layers of material having an electrical potential difference therebetween, the second element including a third layer of material, wherein the second and third layers of material are held at the same electrical potential, such that an electrical potential difference between the first and second elements is created by a fringe field effect.

Further provided, in accordance with certain embodiments of the present invention, is an electrostatic actuator comprising first and second structural elements formed from a single layer of material and having the same first electrical potential and an electrode mounted on and isolated from the first structural element and having a second electrical potential differing from the first electrical potential.

Additionally provided, in accordance with certain embodiments of the present invention, is a method for micro-electro-mechanically actuating a gimbaled element for two-dimensional optical scanning, the method comprising mounting an electrostatically actuated resonant mirror on an electromagnetically activated gimbal; and providing a step-wave shaped input signal to the electromagnetically activated gimbal.

Still further provided, in accordance with certain embodiments of the present invention, is an apparatus for generating controlled pivoting motion, the apparatus comprising a pivoting structural portion and first and second flexures, the first flexure having first and second ends, the second flexure being formed of a piezo-resistive material and having at least first and second ends, at least one of which is fixed, the first flexure being operative to twist along at least a first axis, the second flexure being configured and oriented to define an elongate projection about a second axis perpendicular to the first axis, wherein the pivoting portion is disposed at and fixed relative to the first end of the first flexure and wherein the second end of the first flexure is attached to the second flexure, a piezo-resistive response detector operative to detect at least one characteristic of a piezo-resistive response of at least a portion of the second flexure to pivoting motion of the pivoting structural portion; and a pivoting motion generator operative to generate the pivoting motion based on at least one characteristic of the pivoting motion computed from the at least one characteristic of the piezo-resistive response.

Additionally provided, in accordance with certain embodiments of the present invention, is a method for electrostatically sensing motion of a moving element, the method including providing first and second elements at least one of which is free to move relative to the other, the first element including first and second layers of material having an electrical potential difference therebetween, the second element including a third layer of material having an electrical potential difference with at least one of the first and second layers, generating relative motion between the first and second elements, and measuring the electrical potential difference between the third layer and at least one of the first and second layers.

Also provided, in accordance with certain embodiments of the present invention, is a method for sensing pivoting motion of a pivoting portion of a structural element, the method comprising providing a pivoting structural portion and first and second flexures, the first flexure having first and second ends, the second flexure being formed of a piezo-resistive material and having at least first and second ends, at least one of which is fixed, the first flexure being operative to twist along at least a first axis, the second flexure being configured and oriented to define an elongate projection about a second axis perpendicular to the first axis, wherein the pivoting portion is disposed at and fixed relative to the first end of the first flexure and wherein the second end of the first flexure is attached to the second flexure, detecting at least one characteristic of a piezo-resistive response of at least a portion of the second flexure to pivoting motion of the pivoting structural portion, and computing at least one characteristic of the pivoting motion from the at least one characteristic of the piezo-resistive response.

Further provided, in accordance with certain embodiments of the present invention, is an oscillating scanning mirror apparatus comprising an oscillating scanning mirror, and at least one functional element interacting with the scanning mirror and synchronized directly to the mirror.

Still further provided, in accordance with certain embodiments of the present invention, is a method for projecting an image, the method comprising scanning an area so as to distribute light information representing the image throughout the area, using an interlaced schedule and micro-electromechanical direct current motor apparatus to impart the interlaced schedule, the motor apparatus being operative to repeatedly impart instances of angular motion to an element, wherein the instances of angular motion are temporally interspersed with a sequence of stationary intervals during which the element is stationary, the motor apparatus comprising a stator, a rotor pivoting about an axis along a route having a length of less than several dozen microns, the rotor comprising a flexure element fixedly associated with the stator, the flexure element comprising a magnetic portion; the stator comprising a ferro-magnetic core having a curved configuration which is almost closed thereby to define an air-gap closing the curved configuration and having a width exceeding the route length by only a few microns and a conductive coil wrapped around at least a portion of the almost closed curved configuration of the ferro-magnetic core, at least the magnetic portion of the flexure element being disposed within the air-gap, thereby to generate a first magnetic field in the air-gap, an alternating current flowing through the conductive coil thereby to generate a second, alternating magnetic field within the air gap, the magnetic portion being oriented such that the first magnetic field generated thereby in the air-gap, when interacting with the second, alternating magnetic field within the air-gap, generates a moment about the axis.

Additionally provided, in accordance with certain embodiments of the present invention, is an electro-statically actuated system, the system including first and second elements at least one of which is free to move relative to the other, the first element including first and second layers of material having an electrical potential difference therebetween, the second element including a third layer of material having an electrical potential difference with at least one of the first and second layers.

Also provided, in accordance with certain embodiments of the present invention, is apparatus for electro-statically sensing motion of a moving element, the apparatus including first and second elements at least one of which is free to move relative to the other, the first element including first and second isolated layers of material having an electrical potential difference therebetween; and apparatus for generating relative motion between the first and second elements and measuring the electrical potential difference.

Additionally provided, in accordance with certain embodiments of the present invention, is an actuation method for actuating an active micro-electrical mechanical system, the method comprising providing an active micro-electrical mechanical system comprising at least one functional element and at least one resonating element having a resonance frequency, wherein the at least one functional element is clocked by a clock signal; and sensing the resonance frequency of the resonating element and setting the clock signal to the resonance frequency.

Further provided, in accordance with certain embodiments of the present invention, is a micro-electro-mechanical direct current motor apparatus to repeatedly impart instances of angular motion to an element, wherein the instances of angular motion are temporally interspersed with a sequence of stationary intervals during which the element is stationary, the apparatus comprising a stator, a rotor pivoting about an axis along a route having a length of less than several dozen microns, the rotor comprising a flexure element fixedly associated with the stator, the flexure element comprising a magnetic portion, wherein the stator comprises a ferro-magnetic core having a curved configuration which is almost closed thereby to define an air-gap closing the curved configuration and having a width exceeding the route length by only a few microns; and a conductive coil wrapped around at least a portion of the almost closed curved configuration of the ferromagnetic core, and wherein at least the magnetic portion of the flexure element is disposed within the air-gap, thereby to generate a first magnetic field in the air-gap, and wherein an alternating current flows through the conductive coil thereby to generate a second, alternating magnetic field within the air gap, wherein the magnetic portion is oriented such that the first magnetic field generated thereby in the air-gap, when interacting with the second, alternating magnetic field within the air-gap, generates a moment about the axis.

A particular advantage of the oscillating scanning mirror apparatus shown and described herein is that the functional elements are mutually synchronized irrespective of imprecisions engendered during the manufacturing process of the actuator apparatus.

The term "micro-electro-mechanical" is used herein to include electro-mechanical systems having at least some components whose dimensions are of the order of magnitude of single microns.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein.

Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices.

Terms used in the specification and claims may be construed either in accordance with any definition thereof appearing in the prior art literature or in accordance with the specification.

BRIEF DESCRIPTION OF THE DRAWINGS

Certain embodiments of the invention are illustrated in the following drawings:

FIG. 8b is a schematic top view of the electrostatic actuator shown in FIG. 8a;

FIGS. 15B-21B are diagrams, graphs, tables and illustrations useful in implementing certain embodiments of certain portions of the image projection system of FIG. 15A;

DETAILED DESCRIPTION OF THE INVENTION

Figure 1:
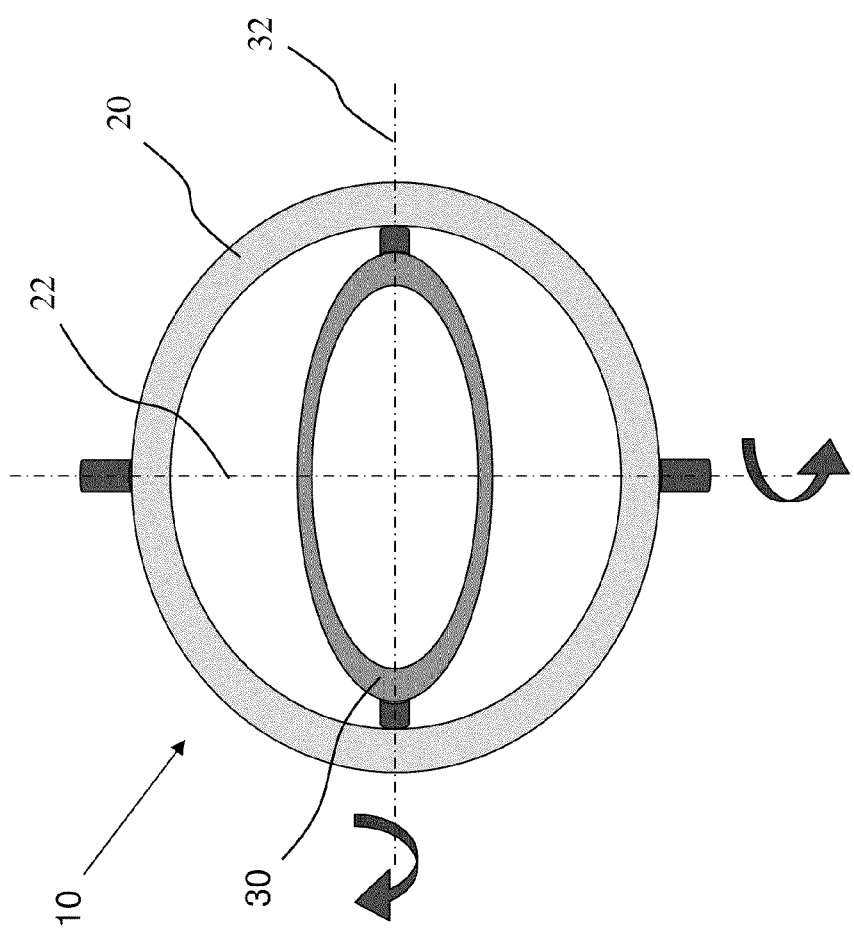
FIG. 1 (Prior art) illustrates a gimbaled element with two degrees of freedom.
Figure 2:
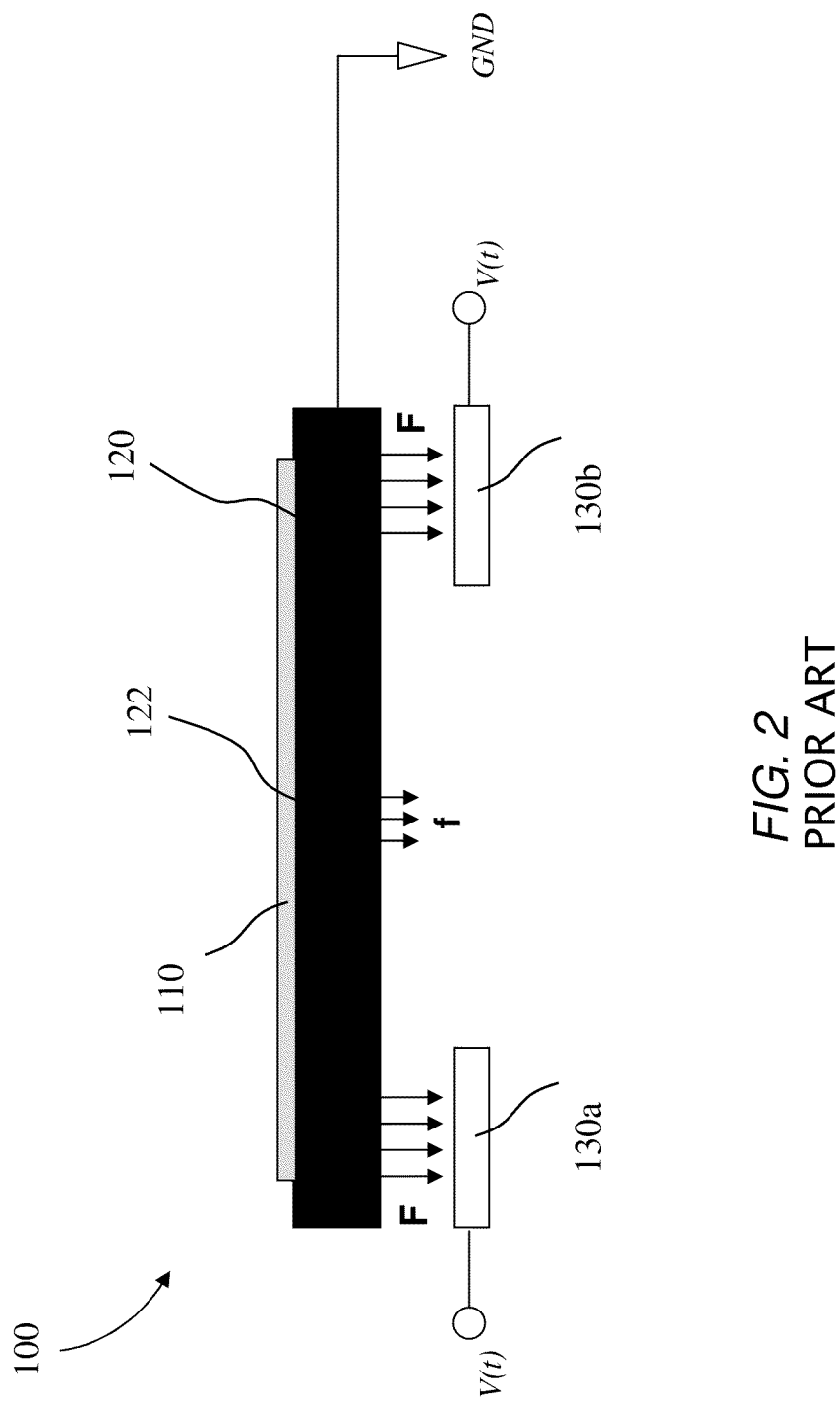
FIG. 2 (Prior art) illustrates a typical prior art electrostatic actuation mechanism.
Figure 3:
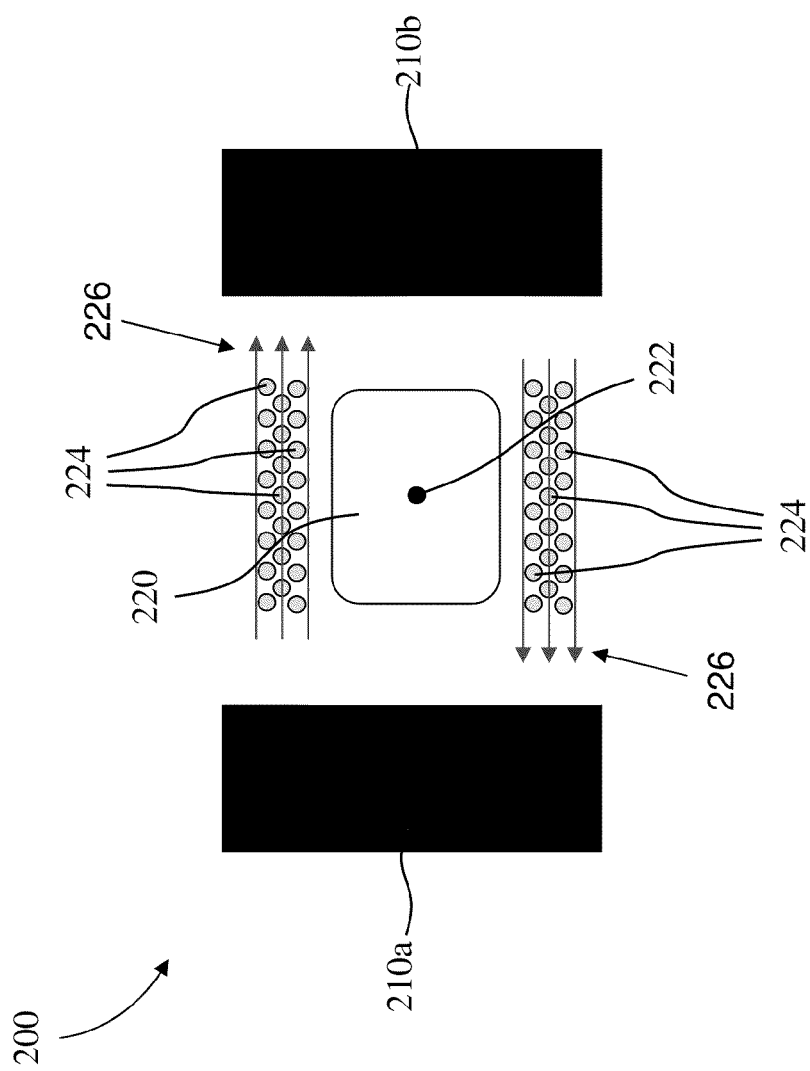
FIG. 3 (Prior art) illustrates a typical prior art electromagnetic actuation mechanism.
Figure 4:
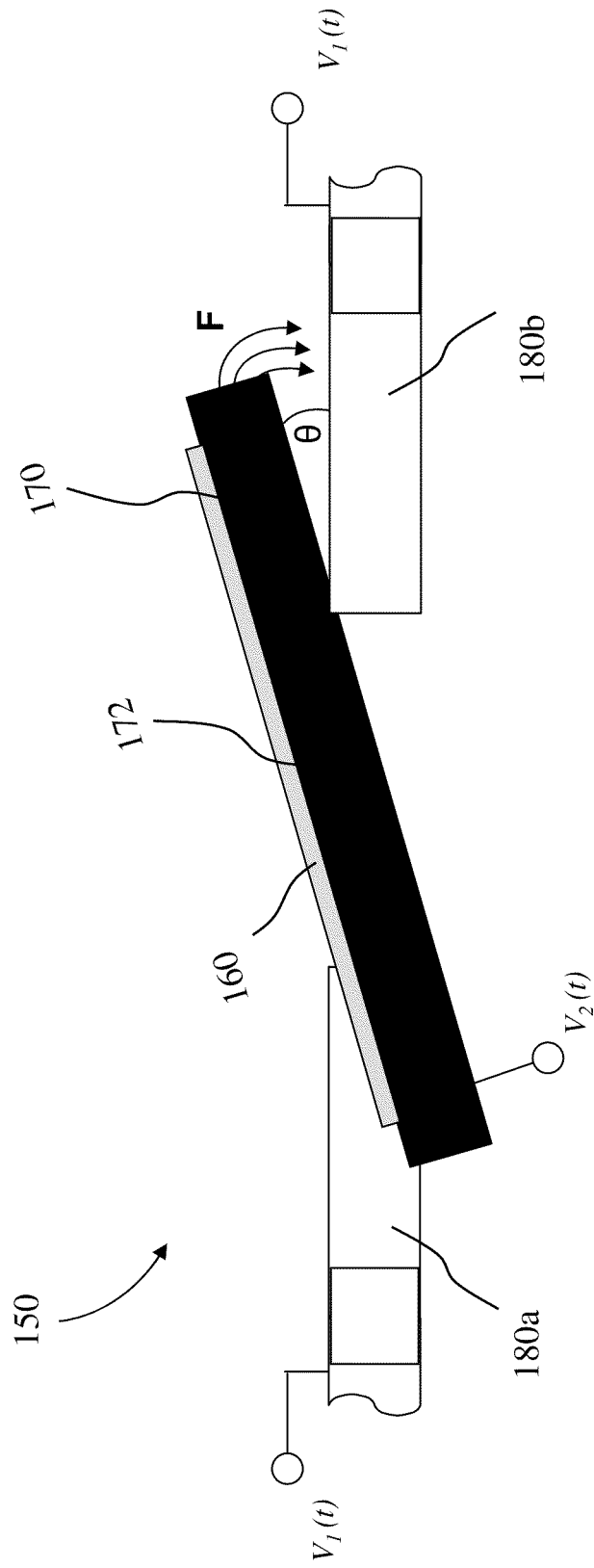
FIG. 4 (Prior art) illustrates a symmetric prior art electrostatic actuation, with scissors-like mechanism.

Certain embodiments of the present invention provide a MEMS actuation scheme and architectures for scanning micro-mirror devices placed on a gimbaled element with a symmetric internal electro-static actuator and a symmetric external electro-magnetic actuator. The external electro-magnets for inducing magnetic flux are static, having the fixed magnets deposited on the mirror itself. The actuator design, according to certain embodiments of the present invention, enables a planar assembly of the micro-mirror and electromagnet and there are no mechanical limitations on the travel of the mirror. Furthermore, the gimbaled element, according to certain embodiments of the present invention, provides better electro-magnetic conversion efficiency with no power limits. This innovative architecture of external electro-magnets results in a very powerful actuator which is symmetric to the scanner vertical rotation axis. Excitation of secondary degree of freedom and image blurring are eliminated. The innovative architecture and design of the gimbaled element enables a standard 4-mask Silicon-On-Insulator (SOI) fabrication process.

Before explaining certain embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 5:
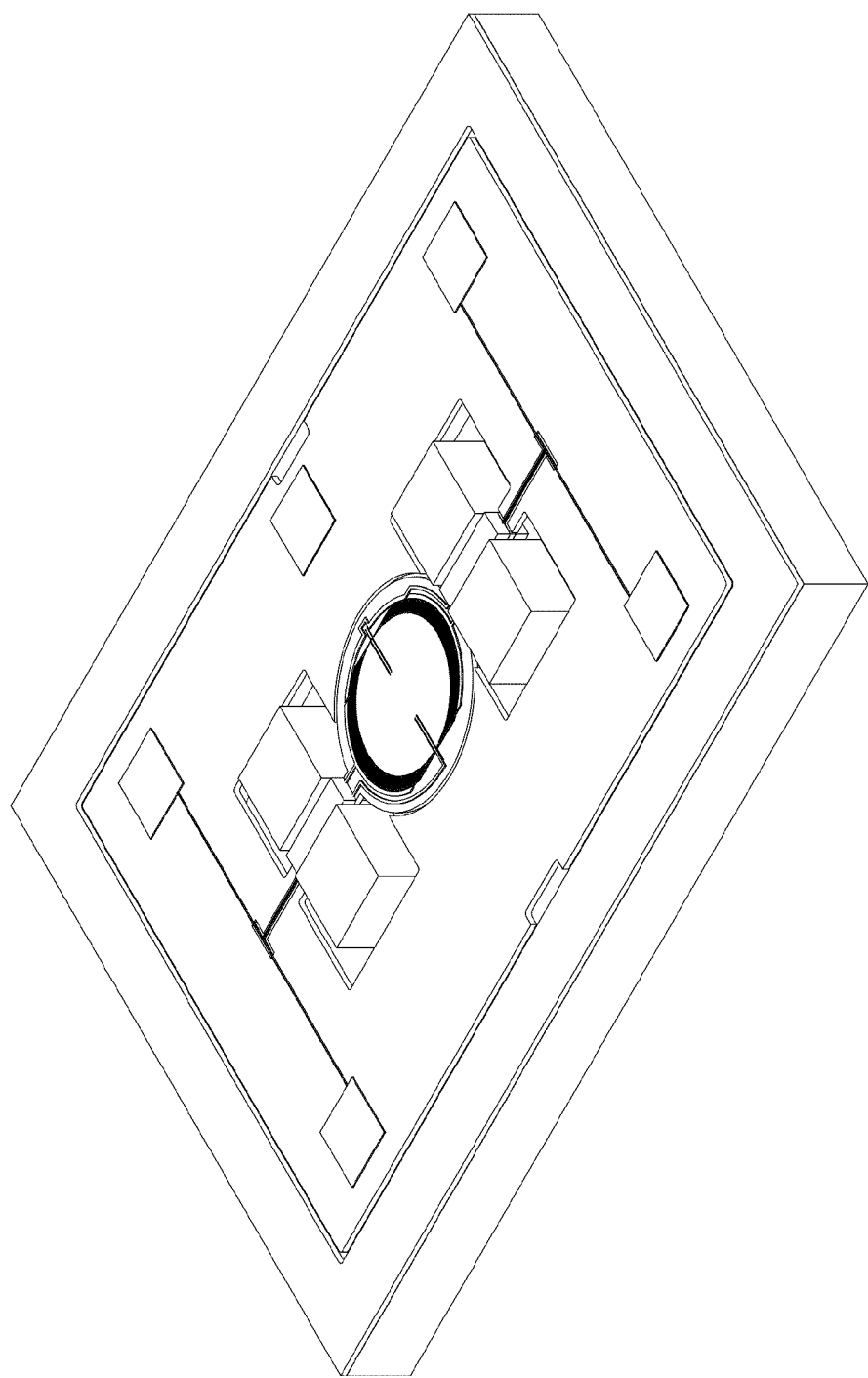
FIG. 5 is a top perspective view illustration of a gimbaled subsystem, according to certain embodiments of the present invention.
Figure 6:
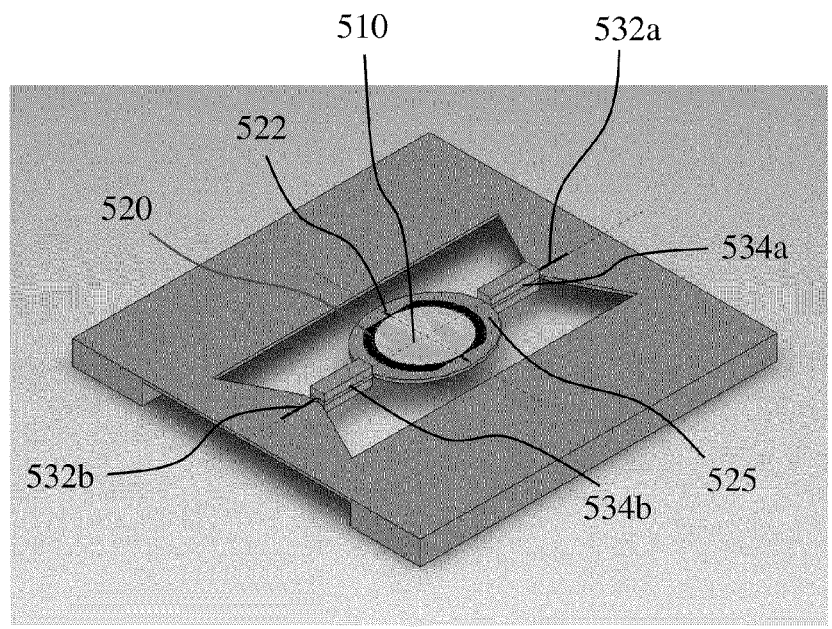
FIG. 6 is a top perspective view illustration of the gimbaled elements (the mirror and annular element with the 2nd degree of freedom) of a gimbaled subsystem, according to certain embodiments of the present invention.

Referring now to the drawings, FIG. 5 is a top perspective view illustration of a gimbaled subsystem, and FIG. 6 is a top perspective view illustration of a gimbaled elements (inner element with mirror 510 and external annular element 525) of a gimbaled subsystem according to certain embodiments of the present invention. Gimbaled subsystem includes a mirror 510 generally internal and at the center; mirror 510 is mounted on an element which serves as the rotor of the electrostatic actuator 520 that moves mirror 510 about axis 522. Gimbaled subsystem also includes an annular element 525, which also serves as the stator of electrostatic actuator 520, can move about axis 532, that are positioned on axis 532. Magnets 534 are positioned adjacent to axis 532, and electromagnets 536 (FIG. 7) are positioned outside of magnets 534. Magnets 534 have a polarity (north-south) in the vertical direction.

Figure 7:
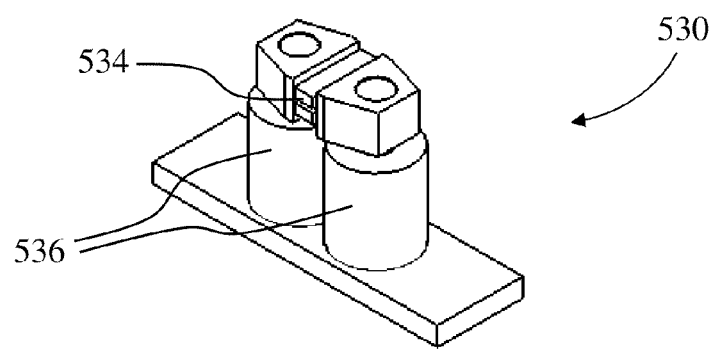
FIG. 7 is a schematic top perspective view of an electromagnetic actuator of a gimbaled subsystem, according to certain embodiments of the present invention.

Reference is now made to FIG. 7, which is a schematic top perspective view of electromagnetic actuator 530 of gimbaled subsystem, according to certain embodiments of the present invention. FIG. 7 schematically illustrates electromagnetic actuator 530 which includes internal magnets 534 rotating about axis 532 and fixed external electromagnets 536. Rotating magnet 534a is attached symmetrically outside axis 532a and magnet 534b is positioned symmetrically outside axis 532b. The electromagnetic actuator has a symmetrical structure and hence the actuating force produced creates only a rotational movement of annular element 525 about axis 532, with no excitation of the inner element with mirror 510. Electromagnetic actuator 530 applies no unwarranted forces on axis 532, which typically, in MEMS technology, is flexible. Due to the symmetrical structure and lack of unwarranted forces on axis 532, the electromagnetic actuator provides a linear electromechanical response.

When DC electric current is introduced into the coils of electromagnets 536, magnetic flux is formed, thereby creating a repelling/attracting force rotating magnets 534 which are attached to axis 532, and thereby creating a rotational movement of annular element 525 about axis 532, in the direction of the repelling/attracting force. When movement is required in the opposite direction, the polarity of the DC electric current is introduced into the coils of electromagnets 536 is changed, thereby creating magnetic flux in the opposite direction. The electromagnet actuation actuates outer, annular element 525 of gimbaled subsystem, providing the scan across the vertical axis, which is done at a relative low frequency, typically a few tens of Hz.

The design of electromagnetic actuation enables a planar assembly of micro-mirror 510. The design does not suffer from mechanical limitations on the travel of the mirror and provides good electromagnetic conversion efficiency with no power limits.

Certain embodiments of the present invention seek to overcome the complexity of the implementation of electrostatic actuation of dual-gimbaled scanners, with a design adapted for a standard 4-mask SOI fabrication process. The architecture uses a symmetric structure and a grounding scheme described in FIGS. 8a and 8b which enables the same electric potential to be applied to all the structural matter of the device, thus simplifying the implementation of the actuator. The structure provides highly dense actuation forces in a relatively small chip area, and the symmetry of the actuator 520 ensures no mechanical coupling between the two axes.

Figure 8A:
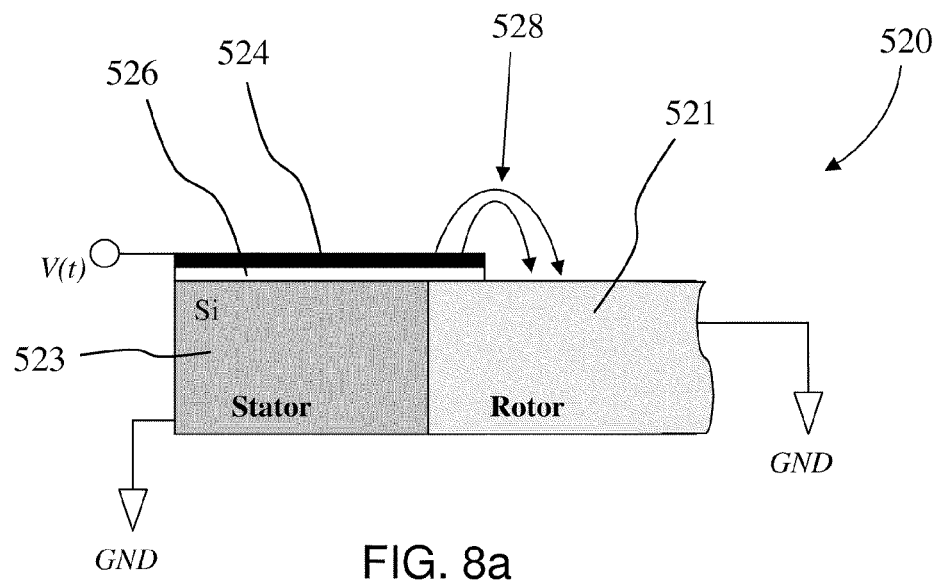
FIG. 8a is a schematic front view of an electrostatic actuator of a gimbaled subsystem, according to certain embodiments of the present invention.
Figure 8B:
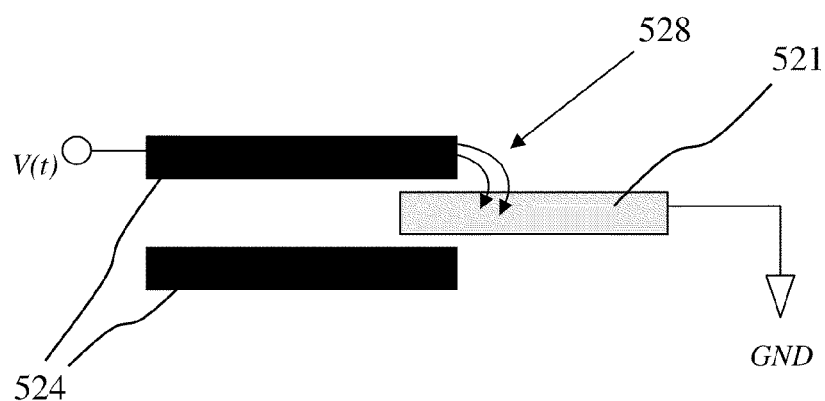

Reference is now made to FIGS. 8a and 8b. FIG. 8a is a schematic front view of a comb-like structured electrostatic actuator 520 of the gimbaled subsystem, according to certain embodiments of the present invention, and FIG. 8b is a schematic top view of the electrostatic actuator 520 of FIG. 8 a. The actuation scheme utilizes fringing fields of electrostatic force fields 528 between an electrode 524, placed on top of stator 523, and rotor 521. Both stator 523 and rotor 521 are at the same electric potential and manufactured from the same Si layer in the same process.

The stator 523 may comprise teeth made of Si which may have a thin layer of insulator 526 and then a thin metal layer 524. When an electric potential difference is introduced between the Si layer of rotor 521 and the thin metal layer 524 of stator 523, a force 528 (FIG. 8A) created from the fringing electrostatic fields causes rotor 521 to rotate about its axis.

Figure 9:
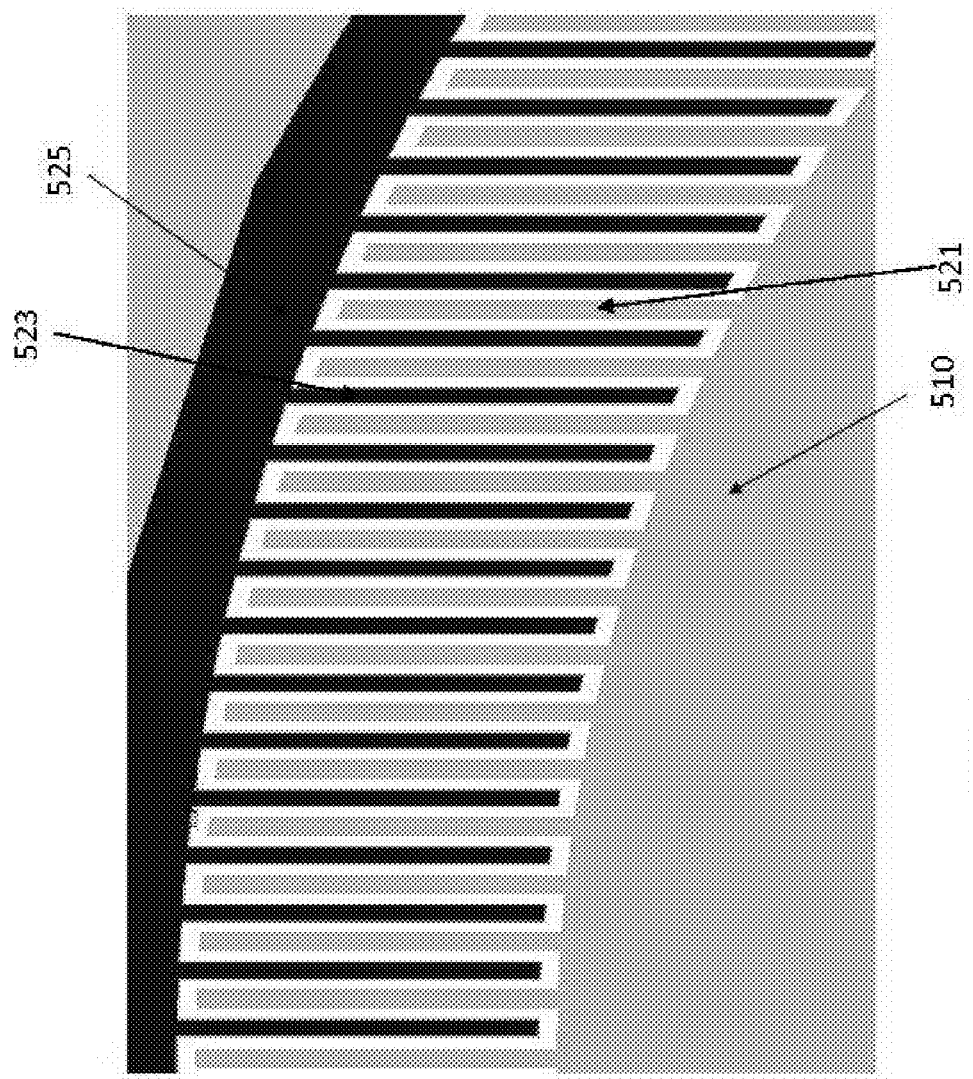
FIG. 9 depicts a comb drive structure.

Reference is also made to FIG. 9 which illustrates the comb structure of electrostatic actuator 520, including the multiple teeth of rotor 521 and respective multiple teeth of stator 523.

The multiple teeth of rotor 521 are affixed to the inner element of gimbaled subsystem with mirror 510, and the multiple teeth of stator 523 are affixed to external annular element 525. Hence, electrostatic actuator 520 actuates inner element of gimbaled subsystem, providing the scan across the horizontal axis, which is done at a relatively high frequency, typically a few KHz.

Electrostatic actuator 520 has a symmetrical structure, and hence the actuating force produced creates only a rotational movement of inner element with mirror 510 about axis 522, with no excitation of annular element 525 about axis 532. Electrostatic actuator 520 applies no unwarranted forces on axis 522, which typically, in MEMS technology, is flexible. Due to the symmetrical structure and lack of unwarranted forces on axis 522, electrostatic actuator 520 provides electromechanical response around its rotation axis only.

In order to operate the actuators in a closed loop format, feedback sensors may be employed. These sensors can be provided either in the structure itself, or externally (e.g., a position sensing detector).

The present invention uses a combination of frequency and position sensing control schemes, to achieve a more precise and optimized operation of the mirror. The electrostatic drive actuation includes an integrated frequency sensor to obtain high signal-to-noise ratio and the electromagnetic drive actuation includes a position feedback design. The integration of the frequency sensor and the position feedback design provides true raster scanning. The frequency sensing of electrostatic actuator 520, can utilize the comb like fingers of stator 523 and rotor 521.

The electromagnetic drive actuation includes position sensing detectors, which can be implemented as internal sensing in the design of the drive or external sensing element.

Electrostatic actuator 520 actuates inner element of gimbaled subsystem, providing the scan across the horizontal axis, which is done at a relative high frequency, typically a few KHz. The electromagnet actuation actuates outer annular element 525 of gimbaled subsystem, providing the scan across the vertical axis, which is done at a relative lower frequency, typically a few tens of Hz.

There is little or no mechanical coupling of the two degrees of freedom, i.e. electrostatic actuator 520 actuates only the inner element of gimbaled subsystem, and electromagnet actuation actuates only the outer, annular element 525 of gimbaled subsystem.

The dimensions of each of the teeth in the comb structure of FIG. 9, typically defining the interface between the mirror and its gimbal, may for example be approximately as follows: length approximately 50-60 micron, width approximately 4 micron, and thickness—in accordance with the thickness of the silicon layer e.g. 45 micron.

An Electro-Static Actuator, constructed and operative according to certain embodiments of the present invention, is now described.

Figure 10:
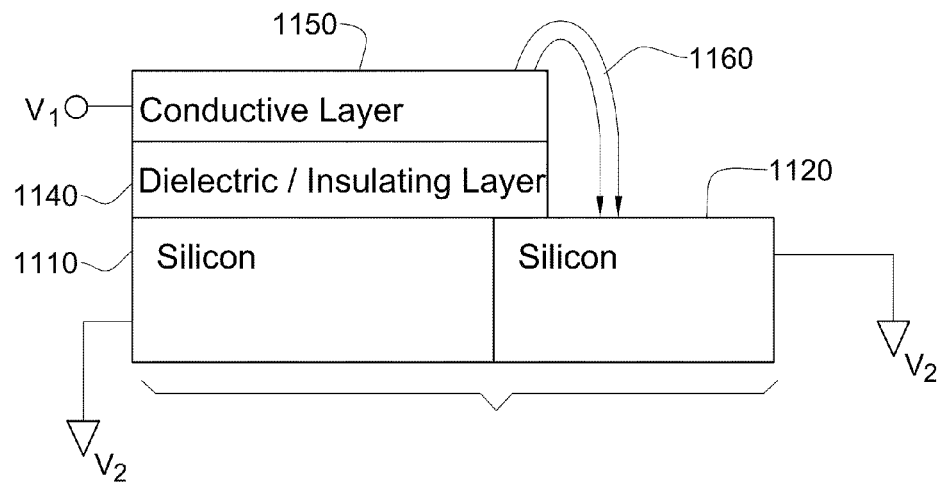
FIG. 10 is a simplified not-to-scale semi-pictorial (front view) semi-electrical diagram of an Electro-Static fringing field actuator, constructed and operative according to certain embodiments of the present invention.
Figure 11:
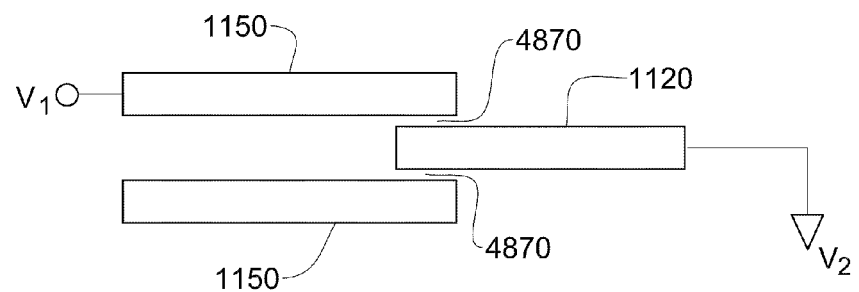
FIG. 11 is a simplified not-to-scale top view illustration of the apparatus of FIG. 10, for a comb-drive architecture.

Reference is now made to FIG. 10 and FIG. 11. FIG.10 is a simplified semi-block semi-electrical diagram of an Electro-Static fringing field actuator, constructed and operative according to certain embodiments of the present invention. FIG. 11 is a simplified illustration of the top view of the apparatus of FIG. 10.

The electro-static actuator of FIG. 10 comprises first and second structural elements 1110 and 1120, at least one of which is free to move relative to the other. Both of the elements may comprise respective portions of the same single planar layer 1130 which may for example comprise a silicon layer. On top of one of the elements, 1110, additional layers 1140 and 1150 are added to form an isolated electrode. The conducting portion 1150 of the electrode may be formed of any conductive material compatible with the manufacturing process. The isolation layer 1140 of the electrode may be formed of any isolating material compatible with the manufacturing process. Due to electric potential differences between the structural elements 1110 and 1120 and the electrode portion 1150, an electric fringe field 1160 is formed. The electrostatic field 1160 induces relative movement of the structural elements 1110 and 1120 by inducing an electrostatic force or torque.

The electro-static actuator of FIG. 10 may, in accordance with a non-limiting example, be designed in accordance with the following guidelines or may be designed in accordance with any other alternative known in the art:

a. Create structural elements 1110 and 1120 in the same planar layer of a structural material such as Silicon bulk. There is no need for electrical isolation of elements 1110 and 1120. At least one of the structural elements is provided with at least one degree of freedom of motion.

b. To ensure effective electrostatic power, structural elements 1110 and 1120 may comprise a comb-drive structure such as that shown in FIG. 9.

c. Deposit at least one isolation layer 1140 on top of one of the structural elements such that the capacitance is maximal between the conductive and structural layers 1150 and 1110, thereby to reduce lost power. Deposit at least one conductive layer 1150 on top of the isolation layer 1140.

d. Use the same electric potential for both structural portions 1110 and 1120. Use a different electric potential for the conductive layer 1150 to form the fringe electric field 1160 between the two structural elements 1110 and 1120 thereby to generate movement of at least one of these.

Conventional electro-static actuators are characterized by different electric potentials being applied to the structural portions of the two relatively moving elements. This is a complicating factor for manufacturing mandating mutual isolation of the two elements. Also, in conventional devices, the actuating electric field ("directional field") is that induced between the two structural areas of the relatively moving elements rather than the "curved" electrical fringing field as in certain embodiments of the present invention.

An Electro-Static Sensor, constructed and operative according to certain embodiments of the present invention, is now described.

Figure 12A:
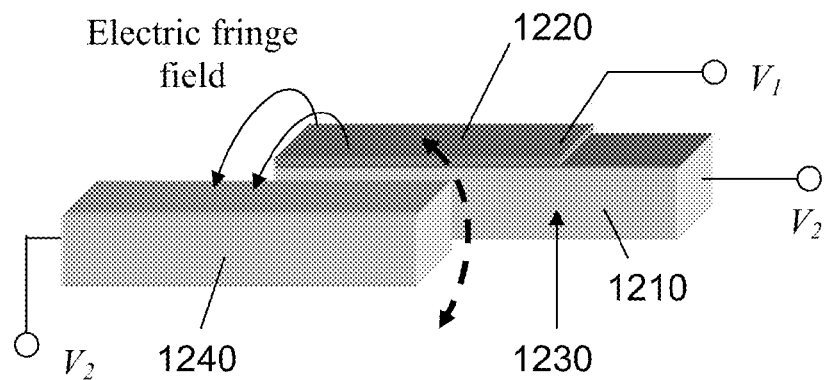
FIG. 12A is a simplified isometric view of an Electro-Static fringing field sensor constructed and operative according to certain embodiments of the present invention.
Figure 12B:
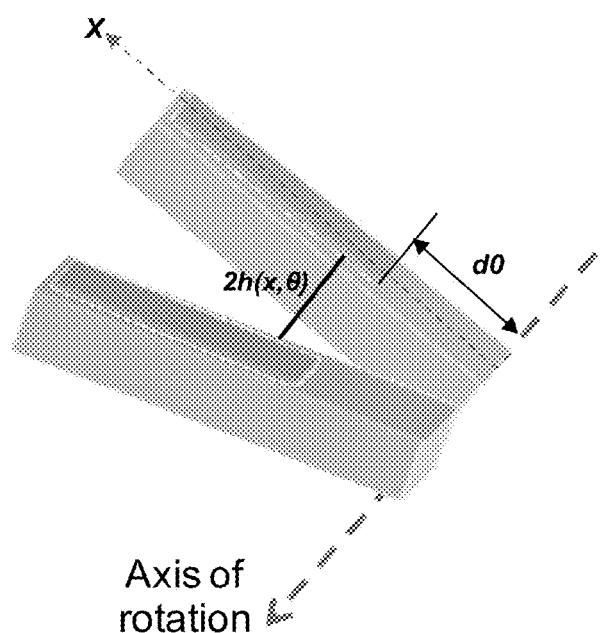
FIG. 12B is an alternative to the apparatus of FIG. 12A.

Reference is now made to FIG. 12A, which is a simplified isometric view of an Electro-Static fringing field sensor constructed and operative according to certain embodiments of the present invention which is functionally operative as a variable capacitor.

The apparatus of FIG. 12A includes first and second structural elements at least one of which is free to move relative to the other, the first element 1210 including first and second isolated layers of material 1220 and 1230 at potentials V1 and V2 having an electrical potential difference V1–V2 therebetween, the second element 1240 including a third layer of material typically formed of the same layer as the structural layer 1230 of the first element. Not shown is an apparatus for generating relative motion between the first and second elements 1210 and 1240 e.g. motion of the second element 1240 back and forth along the dashed line, and an apparatus for measuring the electrical potential difference V1–V2. The electric fringe field induced by the apparatus of FIG. 12A is indicated by solid arrows.

The sensor of FIG. 12A may be similar or identical, in structure, in operation, and in method of manufacture, to the electro-static fringing field actuator of FIGS. 10-11. Both devices typically utilize a "curved electrostatic field" as shown. However, in the sensor of FIG. 12A, instead of inducing movement between the elements, capacitance changes due to relative movement of the first and second elements are read. Any suitable conventional capacitance sensing electrical circuits may be used to sense the change in the induced capacitance between the first and second elements due to relative motion thereof. The output of the sensor typically comprises a measurement of the relative motion between the elements, and/or the frequency of that motion.

A step motor, constructed and operative according to certain embodiments of the present invention, is now described.

Figure 13:
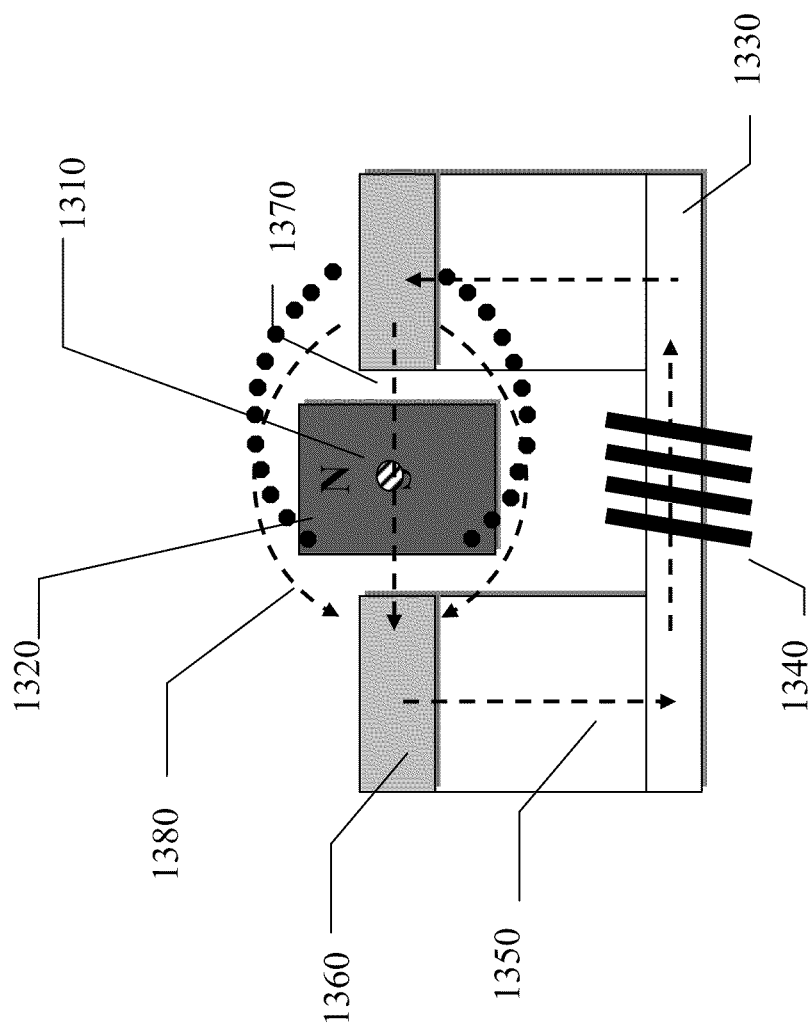
FIG. 13 is a simplified cross-sectional illustration of an Electro-magnetic actuator constructed and operative according to certain embodiments of the present invention.

Reference is now made to FIG. 13 which is a simplified cross-sectional illustration of an electro-magnetic actuator constructed and operative according to certain embodiments of the present invention. The electro-magnetic actuator of FIG. 13, as may be appreciated also from FIG. 22, typically comprises a Rotor and Stator. The Rotor comprises a structural element which forms a rotation axis 1310, around which the Rotor rotates, and a magnet 1320 whose center co-aligns with the axis of rotation 1310. The Stator comprises a ferromagnetic core 1330, in which induced magnetic flux 1350, indicated by dashed lines, flows, conductive coils 1340 to induce the electromagnetic flux, and includes air-gaps 1370.

By applying alternating current to the conductive coils 1340, electro-magnetic flux 1350 is induced in the electromagnetic core 1330 and propagates therewithin, across the air gaps 1370 and the Rotor structure along a closed path as indicated by the dashed lines. The direction of the flux (counterclockwise in the illustration) is derived from the direction of the alternating current in the coils. Due to the dipole of the magnet 1320, the flux 1350 applies torque which creates a rotational movement of the Rotor. Reversing the direction of the flux induces an opposite torque.

The resulting symmetric magnetic flux field 1380 operating on the magnet 1320 and generating the pivot motion thereof about axis 1310, is indicated by dotted lines.

In order to operate the actuator in a "step" function wave form, the actuator's stall torque is increased by increasing the efficiency of the actuator. To do this, the air gap is reduced, typically to only a few microns, utilizing MEMS fabrication techniques and a suitable architecture such as a comb-drive architecture. The Rotor is designed with minimum inertia.

The electro-magnetic actuator of FIG. 13 may, in accordance with a non-limiting example, be designed in accordance with the following guidelines or may be designed in accordance with any other alternative known in the art:
 a. Create the electro-magnetic circuit using a ferromagnetic material such as Covar.
 b. Minimize the air gaps 1370 to several microns using conventional MEMS fabrication techniques to generate, typically a comb-drive architecture.
 c. Minimize the inertia of the Rotor including suitably orienting magnets 1320 e.g. along the rotation axis rather than perpendicular thereto.
 d. Utilize compounded magnets (e.g., NbFeB) in order to increase magnetic field power.
 e. Create at least one coil, such as CMOS fabricated coils in order to increase current density.
 e. Align Rotor and Stator so as to maintain symmetry of the electro-magnetic flux relative to the axis 1310.

Figures 20, 21A:
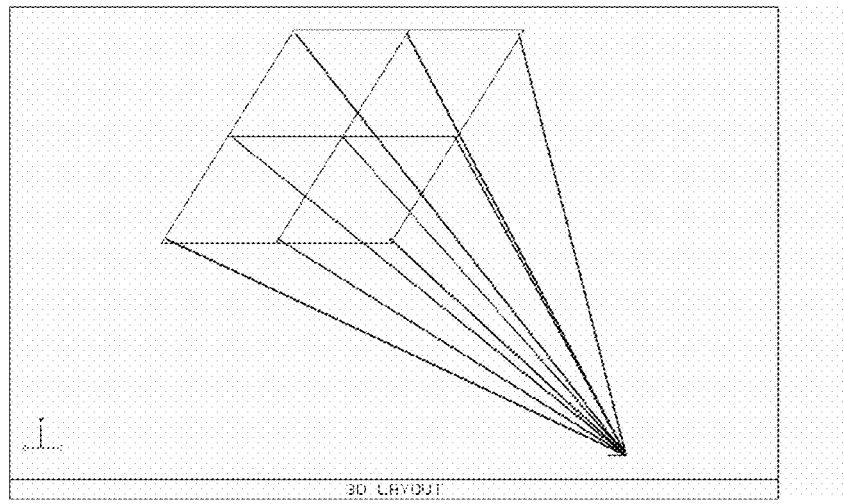
Figure 21B:
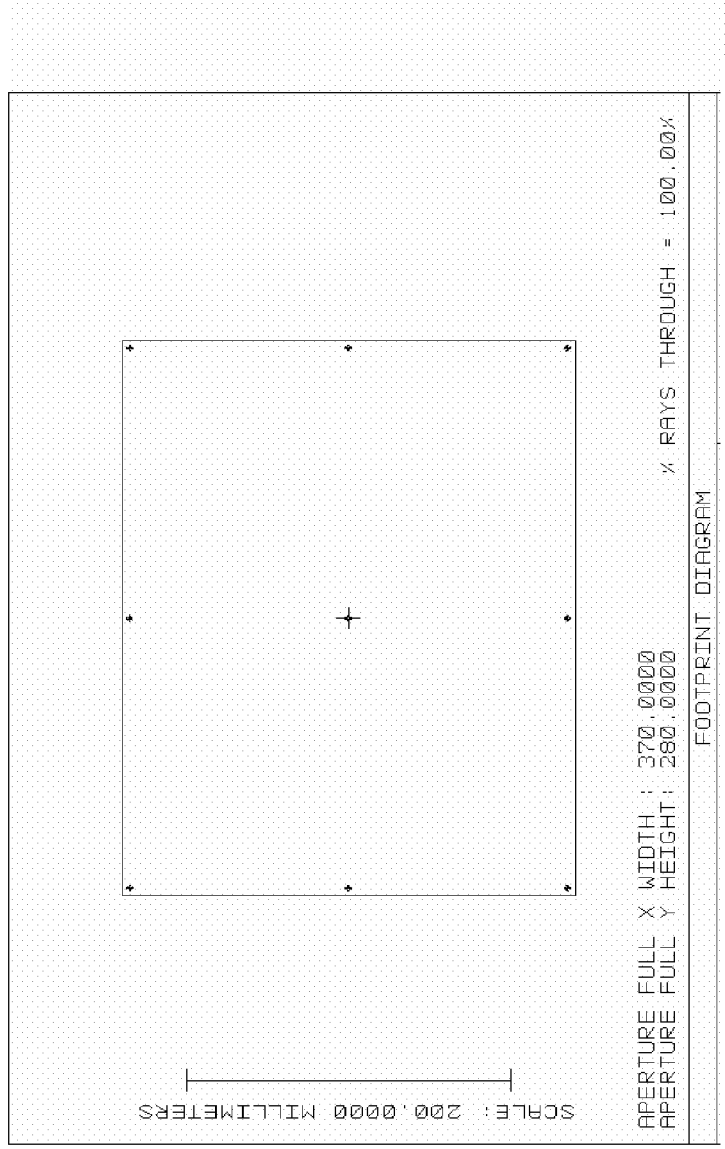

A particular advantage of the illustrated embodiment is that the air gap can be only several microns of a meter resulting in a substantial torque increase. To maintain efficiency of the actuator the Rotor is designed so as to reduce inertia (e.g., align the magnets along the rotation axis and not perpendicular thereto), thereby reducing the resistance of the actuator thus achieving high torques. As a result, out-of-plane movement is discrete and precise. Movement is fully controlled, enabling any desired out-of-plane movement regime to be implemented. When used in scanning mirrors, the advantages of the apparatus of FIG. 13 include elimination of pinch distortion e.g. as shown in FIGS. 20 and 21, thus utilizing more screen area; facilitation of an interlaced scanning regime; even distribution of the signal over the display screen, and reduction of operation frequency.

In conventional devices, coils are formed on the Rotor and permanent magnets are formed on the Stator. In addition, some conventional devices, which use CMOS fabricated coils suffer from lack of symmetry resulting in induction of torque as well as unwarranted forces adversely affecting the precision of motion of the Rotor. Conventional devices are characterized by air gaps vastly larger than those shown and described herein, which diminishes the effective actuator power. Large Rotor inertia ("mass") in conventional devices also tends to diminish the effective actuator power, relative to certain embodiments of the present invention. The operating scheme in conventional devices uses a linear "ramp" function wave form rather than a "step" function wave form as in certain embodiments of the present invention.

Micro-machining techniques may be employed to manufacture the apparatus such that the air gap is accurately sized. Structural holders may be used for the flux directors so as to provide accurate spacers between the flux directors and the rotating element, thereby to determine the air gap. Alternatively or in addition, a comb-drive structure may be used both for the flux directors and for the rotating element such that the air gap between the combs is of an order of magnitude of only a few microns.

An apparatus for sensing pivoting motion, constructed and operative according to certain embodiments of the present invention, is now described.

Figure 14:
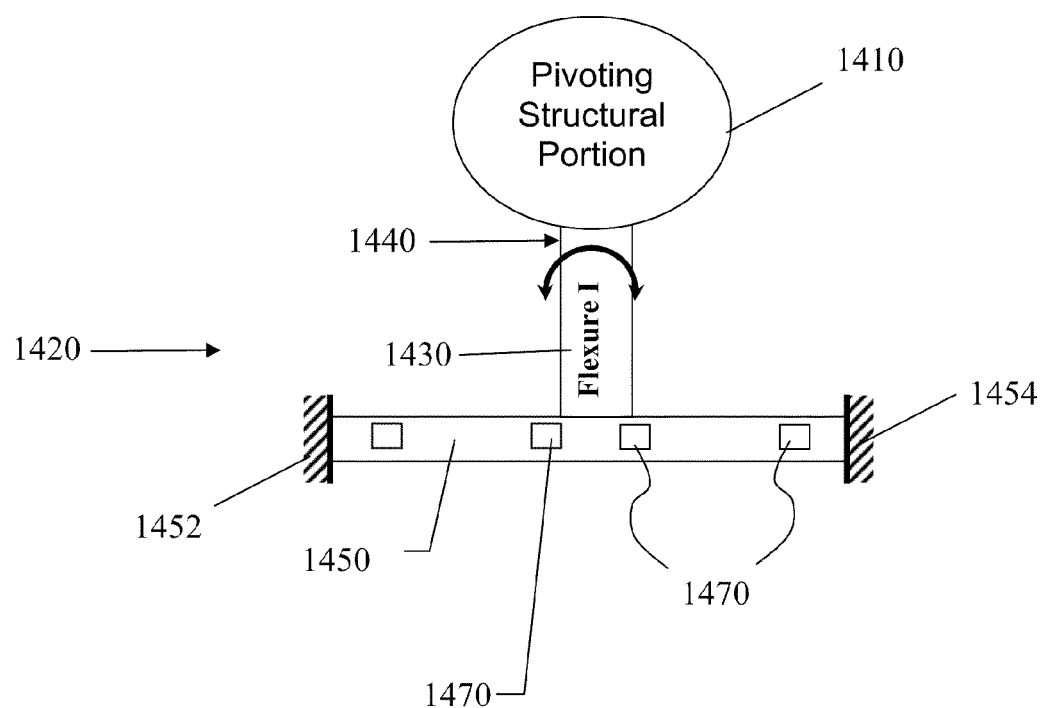
FIG. 14 is a simplified front-view illustration of a Pivoting motion sensor constructed and operative according to certain embodiments of the present invention.

Reference is now made to FIG. 14 which is a simplified front-view illustration of a Pivoting motion sensor constructed and operative according to certain embodiments of the present invention. Typically, the apparatus of FIG. 14 allows conductivity (resistivity) differences between two electrodes disposed along a flexure fixed at both ends and connected via another flexure to a pivoting mass, to compute accordingly difference in the tension stress along the fixed flexure, to compute accordingly the stress of the first flexure, and to compute accordingly the pivoting motion parameters of the first flexure induced by the pivoting mass.

The pivoting motion sensor of FIG. 14 comprises a pivoting mass 1410 formed at least partially of a suitable structural material such as silicon and including a pivoting or torsion suspension, and a flexure structure 1420 including a first flexure 1430 attached at a first end 1440 thereof to the pivoting mass 1410 and a second flexure 1450 attached to a second end 1460 of the first flexure 1430 as shown such that stress is concentrated in the vicinity of second end 1460. The second flexure 1450 is typically fixed at both ends to fixed structural elements or portions 1452 and 1454 such that tension/compression stresses are induced therealong. When the pivoting mass 1410 is rotating or pivoting, torsion stresses are formed in first flexure 1430. Since the first flexure 1430 is rigidly connected to the second flexure 1450, the torsion stresses induce a torque upon the second flexure. A pure torque in the second flexure 1450 is translated into normal stresses in the flexure such as extraction and compression stresses.

Typically, the flexures are constructed of a piezo-resistive matter such as Silicon so as to provide resistance change of the flexure responsive to induced stresses. Pivoting motion may thus be sensed by measuring the resistance change in the flexure, e.g. at resistance measurement locations 1470, after pre-correlating measured resistance changes to the pivoting motion of the mass 1410 in a set-up stage. The measurements typically take into consideration that whereas some stresses in the bulk are positive and some negative, they are distributed evenly in the cross-section such that the total is zero. Therefore, only surface resistance changes are typically measured, e.g. by narrowing sensing electrodes as much as possible so only surface effects register.

The pivoting motion sensor of FIG. 14 may, in accordance with a non-limiting example, be designed in accordance with the following guidelines or may be designed in accordance with any other alternative known in the art:

a. Increase stresses in second flexure 1450 using conventional principles of stress concentration design particularly with regard to the location of the interconnection between the two flexures 1430 and 1450.

b. Modify the structural material from which pivoting portion 1410 is formed, to obtain the best piezo-resistive response, by utilizing matter properties e.g., p-type Silicon at <110> direction.

c. Form at least two electrodes 1470 on top of the second flexure 1450, from a conductive material. Position electrodes 1470 with attention to stress distribution along second flexure 1450, such that the electrodes are located at different stresses.

d. Narrow the gap between the sensing electrodes 1470 to overcome opposite stress effects in the bulk.

e. Implement "Ohmic contact" in order to reduce noises and clear the sensing signal.

Conventional pivoting motion sensors relying on Piezo-Resistive measurements utilize thin films of piezo-resistive materials such as Poly-silicon. By applying strain-gauge sensors in a rosette structure, rotational movement is measured. In contrast, the sensor shown and described in FIG. 14 does not require a thin film to be added to the pivoting mass. Also, since no rosette strain gauge is employed to measure torsion, the sensor may comprise only a single gauge torsion sensor.

Change in resistance correlation to movement (applied torque) may be computed as follows:

$$e = \text{sigma}/E = M\_em * t/2/(E*I) = M\_em * t/2/(E*w*t^3/12)$$

$$dR\_FR = S*e*R$$

yielding:

$$dR\_FR = S*M\_em*t/2/(E*w*t^3/12)*R,$$

where notation is as follows:

dR_FR Change in resistance over full range
R Resistance between two measured electrodes
S Gage Factor according to material properties
M_em Torque applied to flexure 1 to create its movement
t Thickness of flexures
E Young modulus of flexures
w Width of flexures
e Normal stresses in flexure 2

The embodiments of FIGS. 10-14 can be provided separately or in any combination and have a wide variety of applications. For example, applications of the apparatus of FIGS. 10-11 include oscillating micro-mirrors for scanning applications e.g. in laser projection and barcode scanners, optical switching actuation e.g. in optical cross-connect mirror arrays, and oscillating resonators e.g. in mechanical frequency filters. Applications for the apparatus of FIGS. 12A-12b include frequency sensors, e.g. for oscillating micro-mirrors, and Position sensors for out-of-plane movement (e.g., for optical cross-connect). Applications for the step motor apparatus of FIG. 13 include optical cross-connect applications e.g. optical communication switches, Laser radar scanners and 2D scanners e.g. 2D barcode readers and laser projectors. Applications for the apparatus for sensing pivoting motion shown in FIG. 14 include position sensors for out-of-plane movement e.g. scanning micro-mirrors and optical cross-connect, and reliability sensors for stress control (e.g. for fatigue prevention in oscillating masses).

Figure 17:
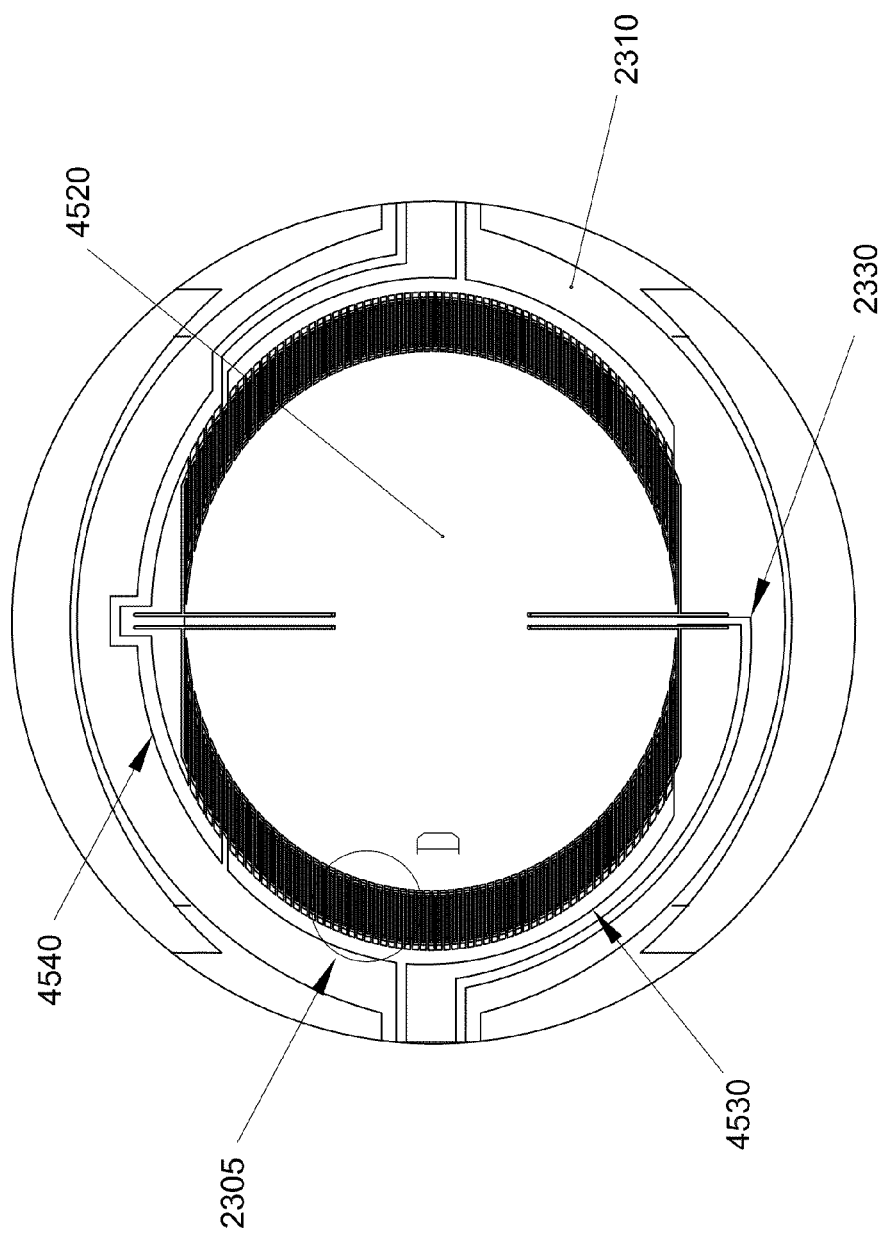
Figure 22:
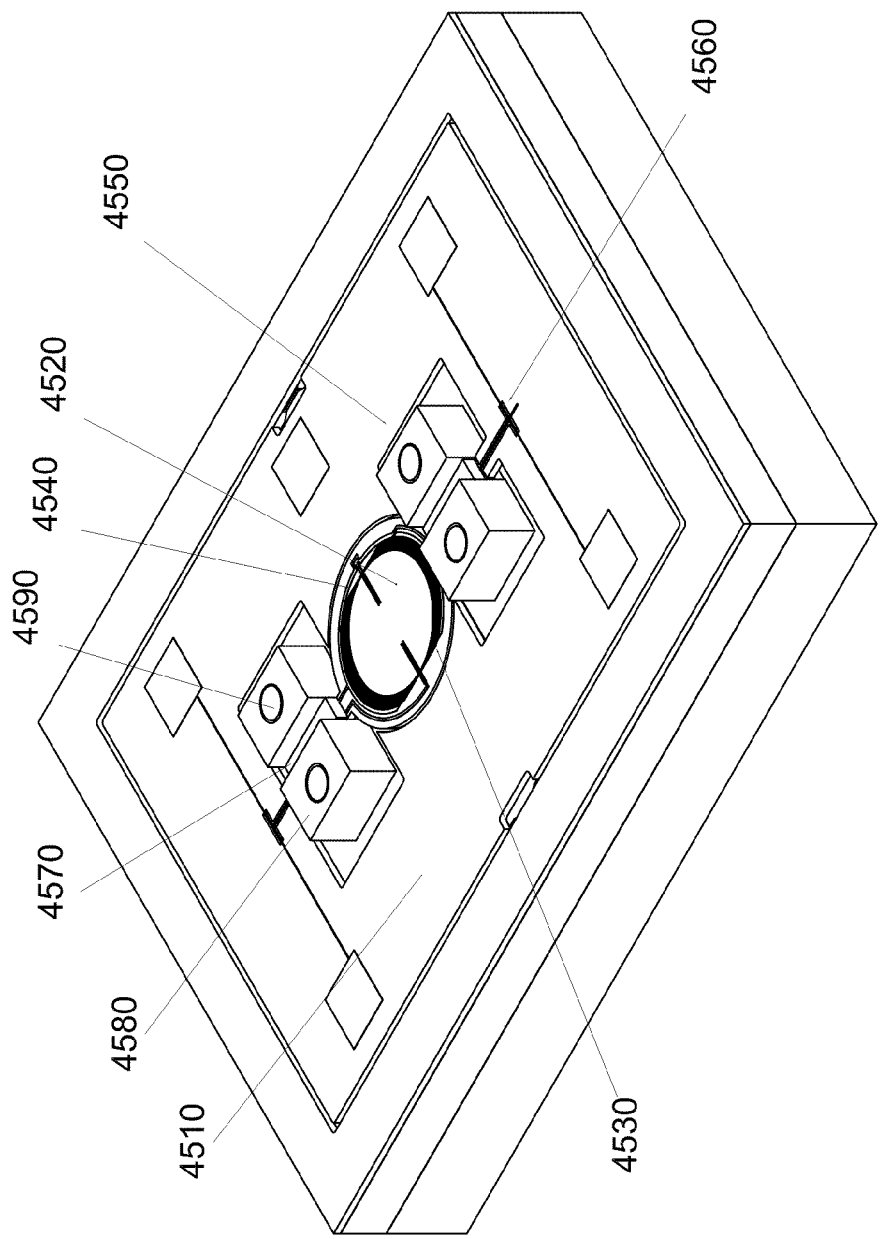
FIG. 22 is a perspective view illustration of the system of FIG. 15A, constructed and operative in accordance with certain embodiments of the present invention.

A particular advantage of the apparatus of FIG. 11 when provided in conjunction with the apparatus of FIG. 5 is simplicity of manufacturing and decoupling of degrees of freedom thereby to eliminate or reduce distortion of the projected image. A particular advantage of combining the apparatus of FIGS. 13 and 14 e.g. as shown in FIG. 22 is the option of effecting a step function scan thereby to eliminate or reduce distortion of the projected image. A particular advantage of combining the resonance frequency sensor shown and described herein with the electrostatic sensor of FIG. 12A and the electro-static actuator of FIG. 11, e.g. as shown in FIG. 17 is the ability to overcome manufacturing inaccuracies in oscillatory actuation and improve synchronization thereby to substantially eliminate blurring. A particular advantage of the step motor apparatus of FIG. 13 when provided in conjunction with the apparatus of FIG. 5 and optionally with the pivot sensor of FIG. 14 is to allow decoupling of the degrees of freedom of the scanning mirror, thereby to allow interlacing, which is often a better scanning method, to be used, resulting in signals evenly distributed over the screen.

Figure 15A:
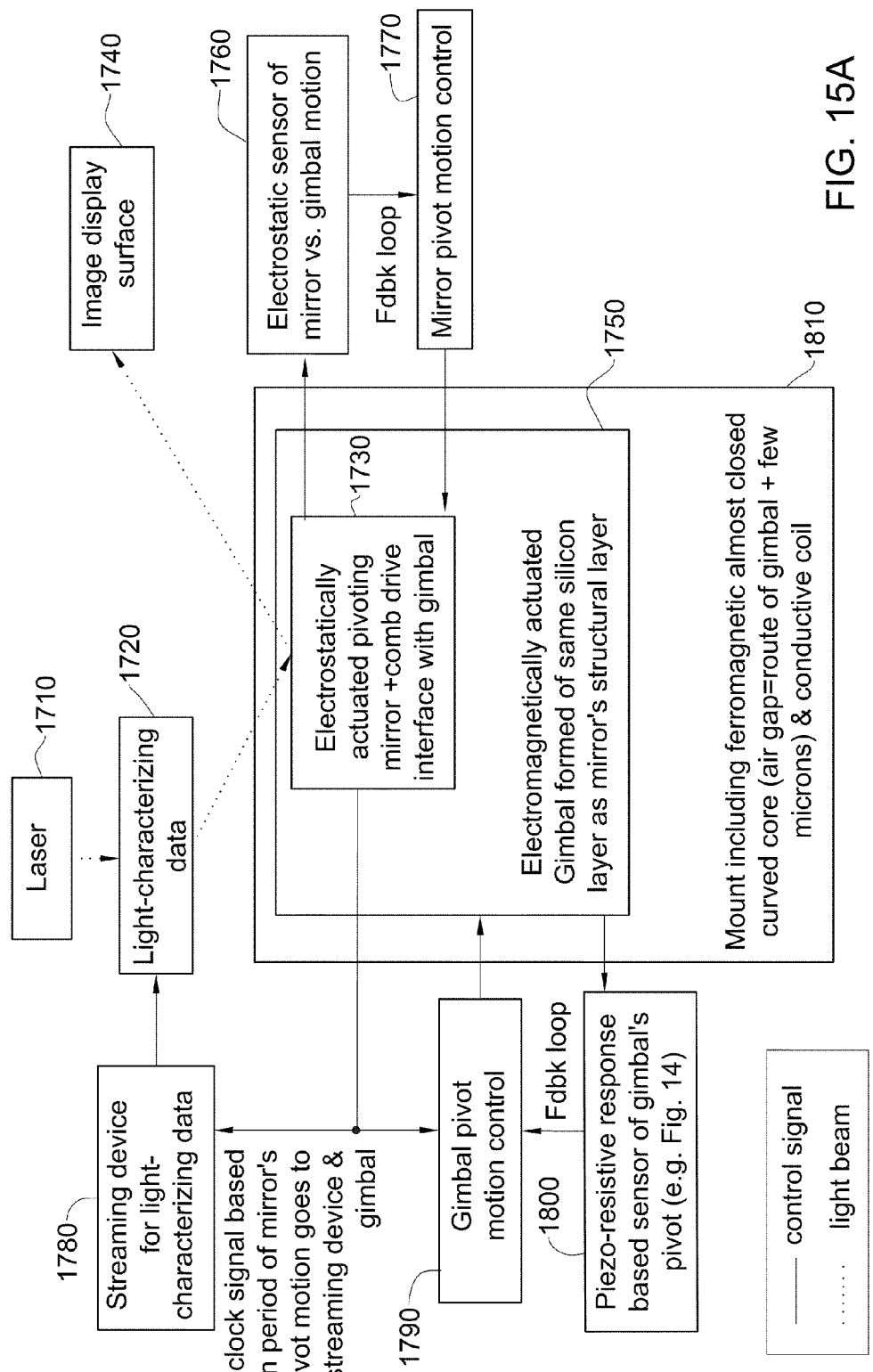
FIG. 15A is a top-level functional block diagram of an image projection system constructed and operative in accordance with certain embodiments of the present invention.

Reference is now made to FIG. 15A which is a simplified functional block diagram of image projection apparatus combining many of the advantages of the embodiments of FIGS. 10-14. The image projection apparatus of FIG. 15A includes a laser 1710 which generates a light beam (indicated by a dotted line) whose photons are characterized by light-characterizing data 1720. The characterized light impinges upon an electro-statically actuated pivoting mirror 1730 and is reflected therefrom onto an image display surface 1740. Typically the mirror has two degrees of freedom due to being mounted on an electromagnetically actuated gimbal 1750 (e.g. as per the embodiment of FIGS. 5-9 herein). Gimbal 1750 is typically formed of the same silicon layer as is the structural layer of mirror 1730. Typically, there is a comb drive interface between the mirror 1730 and the gimbal 1750. The electro-static actuation of the pivoting mirror is typically provided by a feedback loop including an electrostatic sensor 1760 and a mirror pivot motion control unit 1770. The electrostatic sensor 1760, which senses the motion of the mirror 1730 relative to the gimbal 1750 and provides this information to the control unit 1770, is typically constructed and operative in accordance with the embodiment of FIG. 12 as shown and described above. Electrostatic actuation of the mirror is typically in accordance with the embodiment of FIGS. 10-11 as shown and described above.

The light characterizing data 1720 is typically streamed, by a streaming device 1780, in synchrony to the two-degree-of-freedom pivotal motion of the mirror 1730 such that rows of light characterizing data are arranged, due to suitable positioning of the mirror along a first axis, along rows of the image display surface and columns of light characterizing data 20 are arranged, due to suitable positioning of the mirror along a second axis perpendicular to the first axis, along columns of the image display surface 40.

A second feedback loop controls the pivot motion of the gimbal 50. Typically, a gimbal pivot motion control unit 1790 receives feedback from a piezo-resistive response based sensor 1800 of the pivot motion of gimbal 1750, where the sensor 1800 may be constructed and operative in accordance with the embodiment of FIG. 14 as shown and described above.

Typically, the streaming device 1780 and the motion of the gimbal 1750 are both synchronized directly to the period of the mirror 30. For example, an output of the electrostatic sensor 60 may be provided directly, as a clock signal, to the streaming device 1780 and to the gimbal pivot motion control unit 1790.

The gimbal 1750 may be actuated by a step motor comprising a magnet mounted in an air-gap which, as shown in FIG. 13, is formed by a ferromagnetic almost closed curved core about which a conductive coil is wrapped. The air-gap is typically only a few microns in excess of the actual route of the gimbal back and forth within the air gap. It is appreciated that the term "air gap" is used herein to denote any suitable gas space, such as a nitrogen, helium, argon or air space, or a vacuum.

The electro-static actuator embodied in the system of FIG. 15A provides simplicity of manufacturing and decoupling of degrees-of-freedom, with substantially no excitation of unwarranted forces except for torque around the x axis, by means of a design which is symmetrical with respect to the x axis of rotation. The electro-static sensor embodied in the system of FIG. 15 provides oscillating frequency sensing as a system clock for synchronizing system elements to one another, and feedback to the oscillator driver and also simplifies manufacturing. The step motor embodied in the system of FIG. 15A allows scanning to proceed in "straight lines", such that scan lines are generally parallel rather than intersecting, which results in better signal distribution on screen, reduced scanning frequencies, elimination of pinch distortions and interlaced scan ability. Other advantages of the step motor typically include scalability for higher resolutions and larger scanning angles with the same design and decoupling of degrees-of-freedom by a symmetric design with respect to the gimbal's axis of rotation (y, in that there is substantially no excitation of unwarranted forces other than torque about the y axis. The pivoting position sensor embodied in the system of FIG. 15A facilitates "step" function scanning by closing a feedback loop, and simplifies manufacturing. Advantages of the system of FIG. 15A relative to conventional image projection systems include higher image resolution, enhanced repeatability due to elimination of blurring, smaller size, reduced power consumption and reduced cost.

Figure 15B:
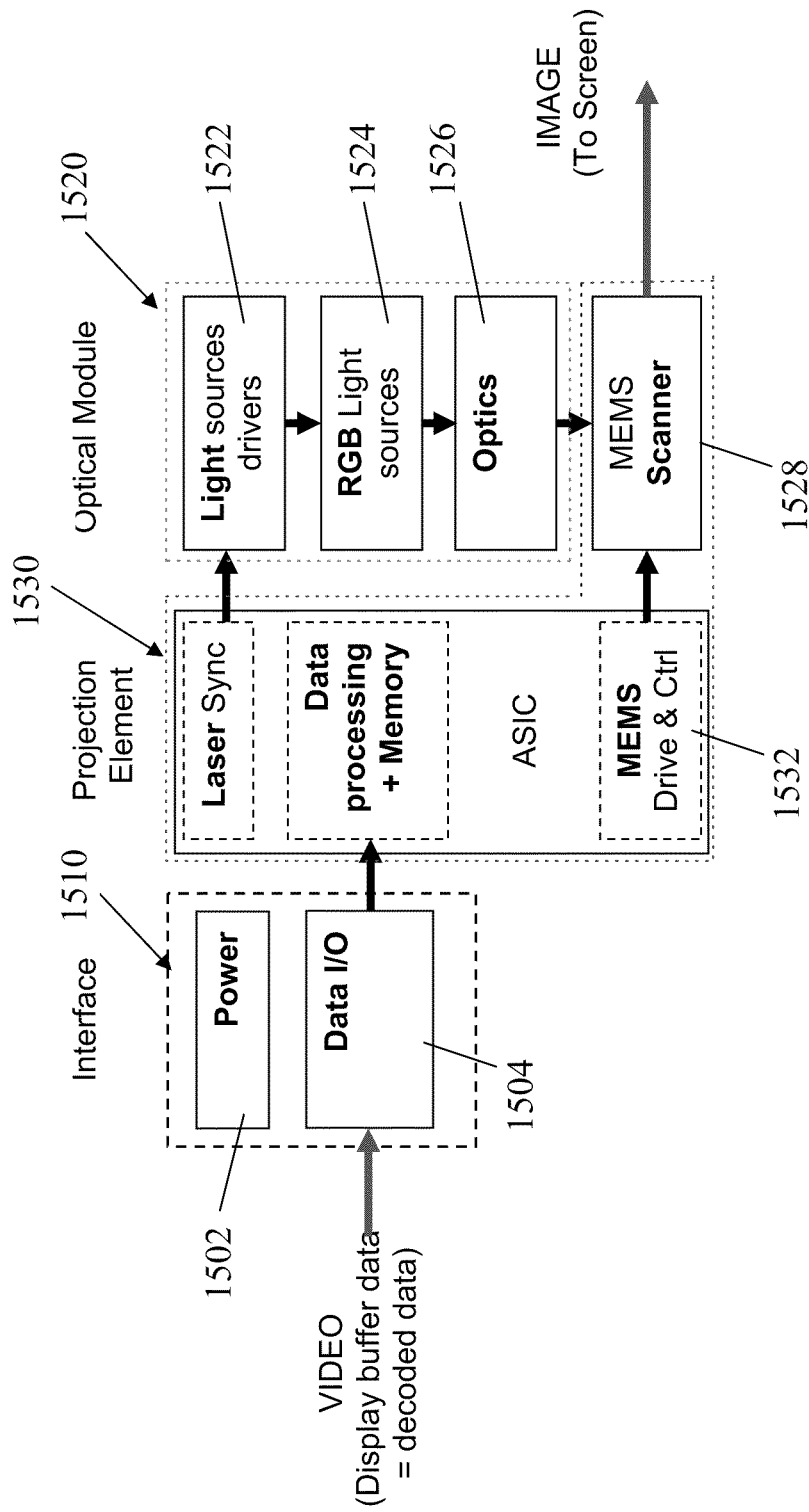

An example image projection system which implements certain features of certain of the embodiments set out above, is now described in detail. FIG. 15B is a simplified functional block diagram illustration of the example image projection system. As shown, the system includes a data and power Interface 1510 to the outside world, an Optical module 1520, including light sources 1522 and 1524, optics 1526 and a MEMS scanner 1528, and an image projection element 1530. The image Projection Element 1530 typically comprises a MEMS scanner chip and an Electronics chip (ASIC) operative to process, synchronize, drive and control both the MEMS scanner 1528 and the Light sources 1522 and 1524. The system typically comprises a combination of electro-static and electro-magnetic actuation schemes, operative in conjunction with a feedback control scheme, all in accordance with certain embodiments of the present invention. The system typically enables the reduction of the size and power consumption of the scanner along with simplifying its manufacturability.

Figure 16:
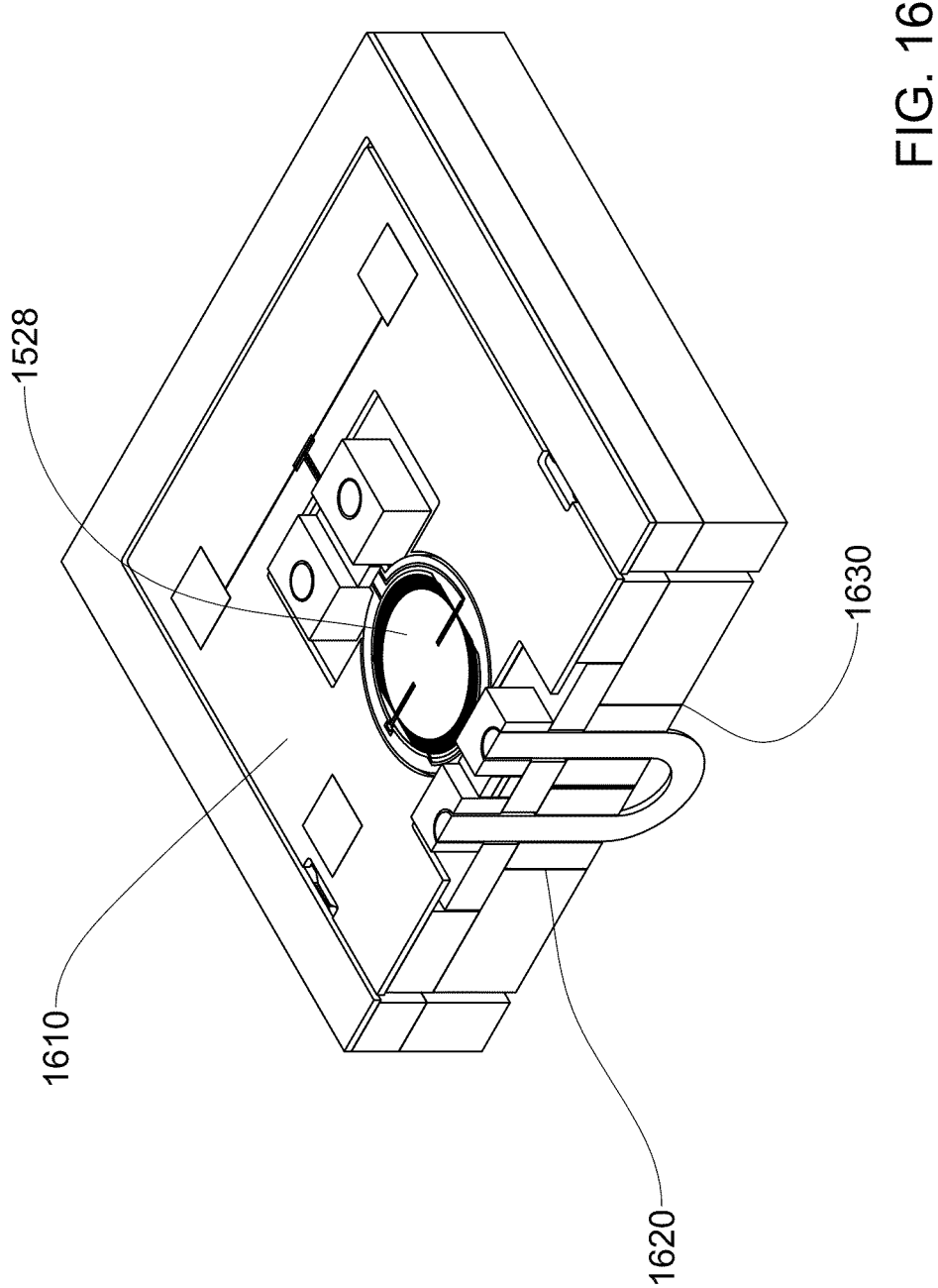

The MEMS scanner 1528 may comprise a gimbaled mirror, with 2 un-coupled actuators, each providing a different Degree-Of-Freedom (DOF), e.g. as presented schematically in FIG. 16. As shown in FIG. 16, the projection element 1530 may comprise a Plastic Cap 1610, the MEMS scanner 1528, an electro-magnetic scanner actuator 1620 electro-magnetically actuating the MEMS scanner 1528, and Drive and Ctrl ASIC 1630.

For the x axis (horizontal scan), an electro-static resonating actuator may be used based on an actuation scheme which utilizes fringing field effects of electric fields. For the y axis (vertical scan), an electro-magnetic actuator based on a macro version of a "DC" motor with rotating magnets, may be employed. In order to create the electro-magnetic circuit base, a second Si chip may be used to precisely position the circuit. In order to drive and control the MEMS scanner 1528, a third chip (an ASIC) may be attached beneath the electro-magnetic chip. The cover 1610 is placed atop the scanner chip, to protect it from dust and handling.

The micro-scanner 1528 of FIG. 16 may comprise a gimbaled micro-mirror with 2 Degrees-Of-Freedom. Example actuation schemes of the two degrees of freedom are now described. In the horizontal (x) direction, operation has a sinusoidal waveform whose frequency is equal to the mechanical first resonance frequency of the mirror (typically about 10 KHz for a SVGA resolution). To achieve this, the electro-static actuator may utilize Electro-Static Fringing Field effect (ES-FF).

Electro-static actuation for dual-gimbaled scanners is known, e.g. as described in Reference 1, however conventional implementations, e.g. are described in References 1 and 5, are complex hence difficult to manufacture. In contrast, the system of the present invention may be fabricated in accordance with a 4-mask Silicon-On-Insulator (SOI) fabrication process. Typically, the architecture includes a symmetric structure and grounding scheme e.g. as shown in FIGS. 8A-8B. In the electro-static fringing field actuation scheme embodied in FIGS. 8A-8B, in which a single comb finger is illustrated as a unit building block, the rotor has a rotational degree of freedom, however this is not intended to be limiting.

In the vertical (y) direction, the micro-scanner 1528 operates in accordance with a pseudo step-function waveform, at a desired refreshment rate of the image (typically about 30 Hz for an interlaced scan). This may be effected using a micro electro-magnetic "DC" motor, wherein an external electromagnet induces magnetic flux and fixed magnets are deposited on the mirror itself. In contrast, conventional devices e.g. as described in References 3 and 4, provide an external magnetic field and current-carrying coils on the mirror surface. A particular advantage of the apparatus of FIG. 16 is the possibility of planar assembly of the micro-mirror and electromagnet. Unlike existing electro-magnetic actuation designs e.g. as described in Reference 40, the system shown and described herein does not suffer from mechanical limitations on the travel of the mirror and provides better electro-magnetic conversion efficiency with substantially no power limits.

The Electro-magnetic actuation scheme described above includes a microscopic variation of a conventional "DC" motor with external coils, shown beneath the mirror plane and rotating permanent magnets assembled on the gimbal's rotating axis. Provision of external electro-magnets may result in a powerful actuator which is symmetric to the scanner's vertical rotation axis, which generally eliminates excitation of secondary degree of freedom and image blurring.

A closed loop feedback control scheme is typically used which differs from current state-of-the-art control schemes, in that a combination of frequency and position sensing control is used to achieve a precise and optimized operation of the scanner. Typically, capacitance sensing is used to sense both frequency and position. Implementation of such feedback control enables the scanner 1528 to scan in a true raster scan mode which is desirable for various applications and reasons, e.g. as described in Reference 6.

Referring again to FIG. 10, the electrostatic actuator shown and described therein operates according to the following equations:

$$\Psi = \frac{1}{2}k_\theta \theta^2 - \frac{1}{2}C\Delta V^2 \quad (1)$$

$$\therefore M^E = \frac{\partial}{\partial \theta}\left(\frac{1}{2}C(\theta)\Delta V^2\right) = \frac{1}{2}\Delta V^2 \frac{\partial C(\theta)}{\partial \theta} \quad (2)$$

where $M^E$ denotes the electrostatic torque.

Referring again to FIG. 12A, typically, a frequency sensor, termed herein the "Horizontal frequency sensor", is implemented inherently in the horizontal electro-static actuator. This sensor is based upon the capacitive actuation scheme of the horizontal scanning, but is connected to a control circuit instead of to a driving circuit e.g. as shown in FIG. 17. The sensor is operative to follow horizontal mirror movement and to sense its capacitance peaks, thereby to determine the oscillating frequency of the mirror. Closing feedback to the driving circuit enables locking of the oscillating frequency and synchronization of the video signals accordingly. The dotted lines in FIG. 17 indicate the control contact of the Horizontal frequency sensor. Capacitance computations for this sensor may be the same as the driving capacitance computations described above.

In order to compute the sensitivity of the sensor, the overall capacitance at full-range is computed, e.g. as described in Reference 7, as follows:

$$C = \frac{\varepsilon d}{h}\left[1 + \frac{h}{d\pi} + \frac{h}{d\pi}\ln\left(\frac{2d\pi}{h}\right) + \frac{h}{d\pi}\ln\left(1 + \frac{2w}{h} + 2\sqrt{\frac{w}{h} + \left(\frac{w}{h}\right)^2}\right)\right] \quad (3)$$

Referring to FIG. 12C, h is half of the gap between the comb-drive fingers (i.e., 2h=g), and w is the finger width. The capacitance is a function of the tilt angle since h=h(θ). Integrating the capacitance over the full range and solving for a set of design parameters yields a full-range capacitance:

$$\tilde{C} = \int_{x=d_0}^{x=d_0+w} C(w, t, h(x, \theta))$$

An example value for the capacitance is $3.43*10^{-14}$ F (per unit block). Since the inertia of the mirror is not likely to be influenced by manufacturing tolerances, and since SOI wafer thicknesses are likely to be very accurate, the natural frequency of the scanning mirror is proportional to the third power of the width of the suspensions:

$$f^2{}_h \propto W^3 \quad (4)$$

Assuming a change of ΔAw in the suspension's width, the relation to the frequency can be expressed as $$f^2{}_{h\,|new} \propto (w+\Delta w)^3 = (w^3 + 2w^2\Delta w + 2w\Delta w^2 + \Delta w^3) \quad (5)$$

Neglecting small size parts yields:

$$f^2{}_h|_{new} \propto 2(w+\Delta w) \quad (6)$$

Comparing this frequency to the previous frequency, it is seen that the change in the frequency is proportional to the width itself:

$$\left(\frac{f_{h|new}}{f_{h|old}}\right)^2 \propto \frac{w^2(w+\Delta w)}{w^3} = 1 + \frac{\Delta w}{w} \quad (7)$$

Since the change in the geometry is usually fixed and depends on process regardless of the width (say a micron at most), it may be hedged by a robust design of both control scheme and suspension width. In the example detailed in the frequency sensitivity table of FIG. 18, assuming a suspension width of 23um, the change in dimension is about 0.5um. Consequently, the frequency change is $$\frac{\Delta w}{w} = \frac{0.5}{23} = 2.1\% \quad (8)$$

For a 10.4 KHz natural frequency, this changes to ~10.1 KHz.

Designing in consideration of the micro-mirror frequency (resolution), frequencies above 10 [KHz] can be tolerated by 10% (not under 10 [KHz]). The design can tolerate 0.5 um fabrication error and still provide a suitable frequency.

Figure 19:
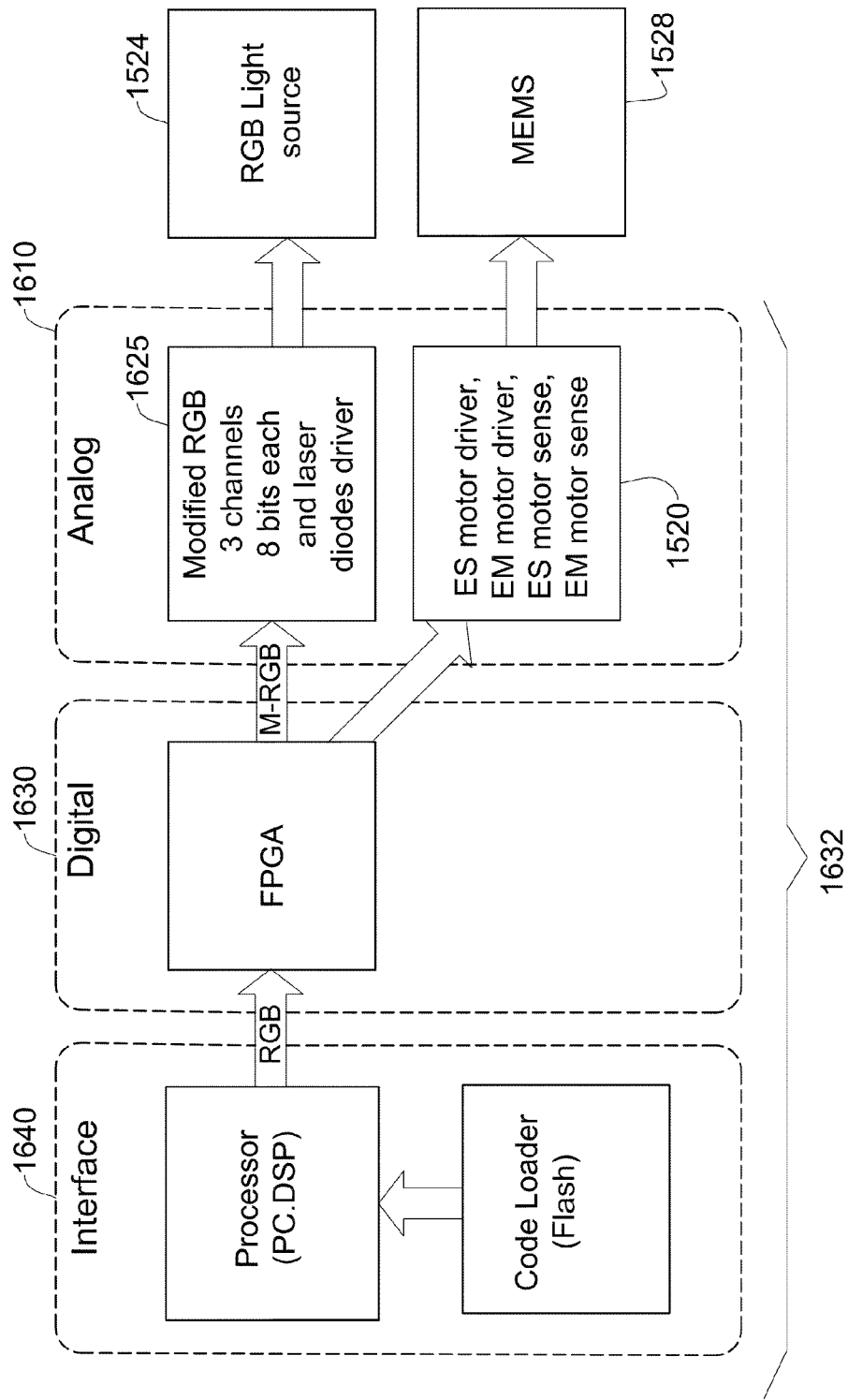

As described above, the image projection unit of FIG. 15B typically includes an ASIC Chip which includes a MEMS drive and control unit 1532. Unit 1532 and its association with RGB light sources 1524 and MEMS scanner 1528 is presented in block diagram form in FIG. 19. As shown, the ASIC chip typically includes an Analog unit 1610, comprising a first functional unit 1620 incorporating MEMS motor drivers and sensing detection circuits and a second functional unit 1625 incorporating Modified RGB video signal drivers to the RGB lasers 1524 of FIG. 15B. The ASIC chip also includes a Digital unit 1630 which retrieves the system clock from the Electro-Static motor sensing circuit of functional unit 1620, and multiplies this clock to create various system clocks (PLL function). Finally, an interface unit 1640 allows the user to control the digital parameters using a graphic user interface, program, and drive RGB pictures and movies.

General Specifications may include: Resolution of 600× 800 (and beyond), Rate of 30 Hz interlaced, yielding an effective rate of 60 Hz, Bi-directional x-direction display scans, and an X-direction scanning rate of 10 KHz+−3 Khz.

Reference is now made to FIG. 22 which is a perspective view illustration of the system of FIG. 15A, constructed and operative in accordance with certain embodiments of the present invention. As shown, the apparatus of FIG. 22 includes a scanning micro-mirror chip 4510, a scanning micro-mirror 4520, an electro-static actuator 4530 of the mirror 4520 e.g. as described above with reference to FIGS. 10-11, an electro-static sensor 4540 sensing motion of the mirror 4520 e.g. as described above with reference to FIGS. 12A-12b, an electro-magnetic step motor 4550 e.g. as described above with reference to FIG. 13, a pivoting sensor 4560 sensing pivoting motion of a gimbal on which the mirror 4520 is mounted e.g. as described above with reference to FIG. 14, a rotating magnet 4570 and a ferro-electric core 4590. Each of these components are described above in detail, e.g. with reference to FIGS. 10-14.

It is appreciated that the apparatus of FIG. 16, described above, is a cut-away drawing of the apparatus of FIG. 22.

Figure 24A:
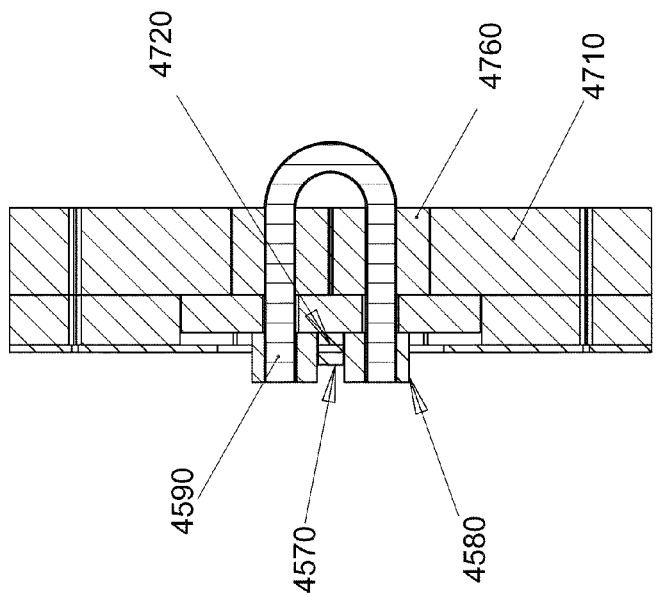
FIG. 24A is a cross-sectional illustration taken along the line A-A of FIG. 23.
Figure 23:
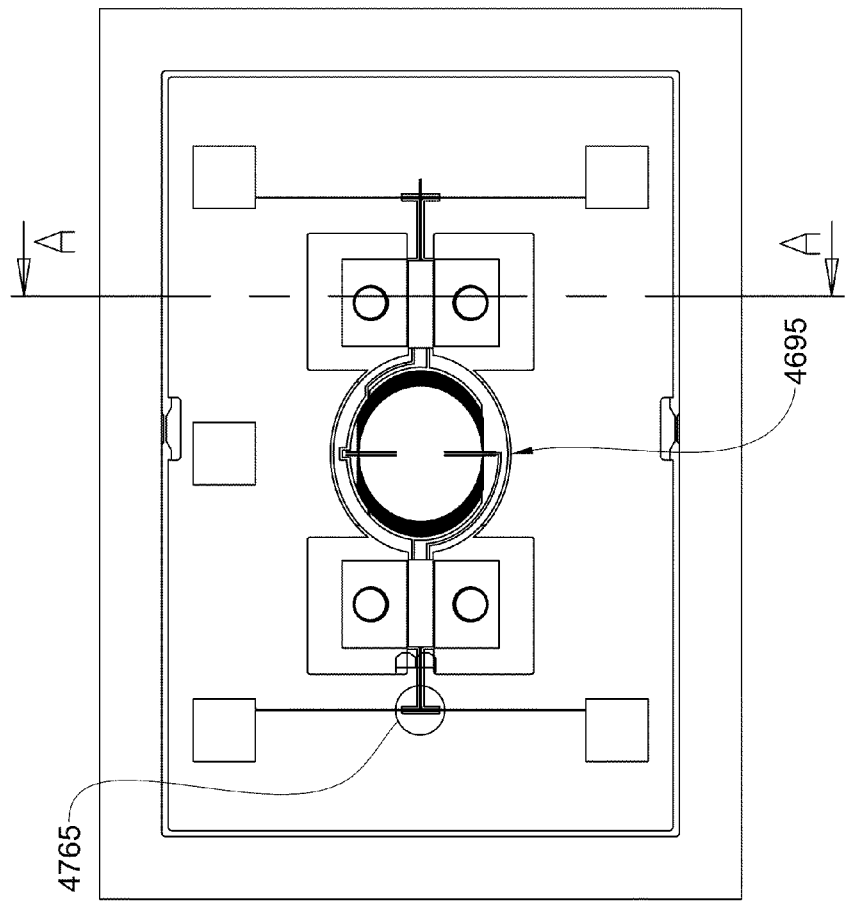
FIG. 23 is a top view illustration of the apparatus of FIG. 22.

FIG. 23 is a top view illustration of the apparatus of FIG. 22 and FIG. 24A is a cross-sectional illustration taken along the line A-A of FIG. 23. Shown in FIG. 24A are the housing 4710 of the step motor 4550, the axis of rotation 4720 of the rotor of the step motor 4550, and the coil 4760 surrounding the core 4590, all of which may be as described in detail above with reference to FIG. 13. Also shown is gimbal-mounted mirror apparatus 4695, whose structure is best appreciated with reference to FIGS. 17 and 25.

Figure 24B:
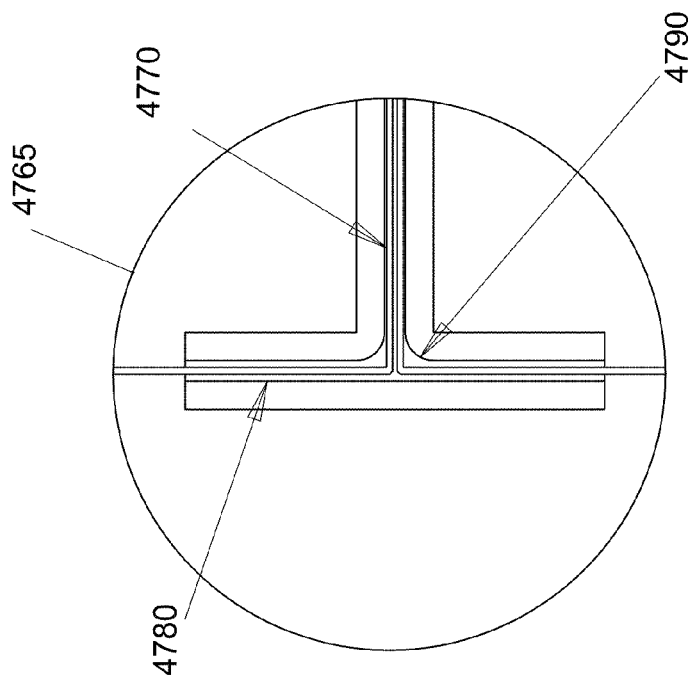
FIG. 24B is an enlargement of a portion of the apparatus of FIG. 23, showing a flexure structure constructed and operative in accordance with certain embodiments of the present invention.

FIG. 24B is an enlargement of a portion 4765 of the apparatus of FIG. 23, showing a flexure structure constructed and operative in accordance with certain embodiments of the present invention. Shown are a first pivoting flexure 4770 and a second flexure 4780, operatively associated with one another to generate a stress concentration area 4790, all as shown and described above with reference to FIG. 14.

Figure 25:
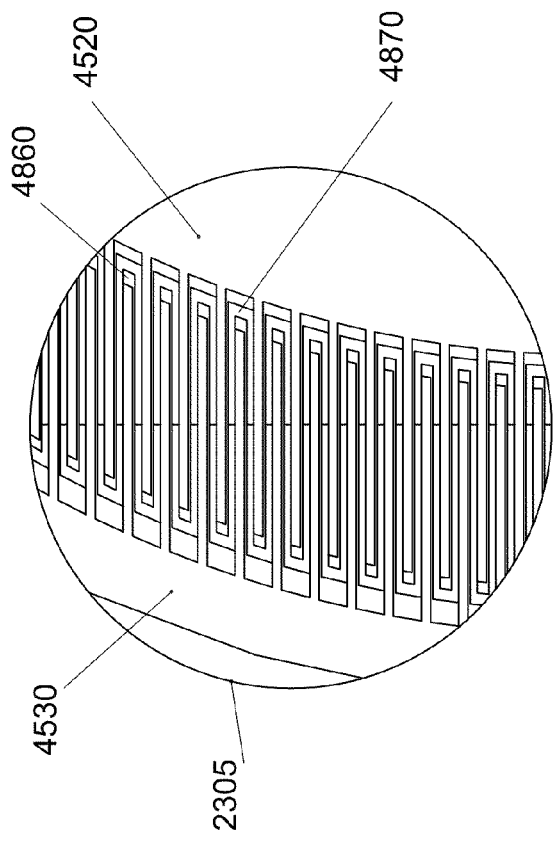
FIG. 25 is an enlargement of a portion of the comb drive shown in FIG. 17, which is constructed and operative in accordance with certain embodiments of the present invention.

FIG. 25 is an enlargement of a portion 2305 of the comb drive shown in FIG. 17, which is constructed and operative in accordance with certain embodiments of the present invention. The apparatus of FIG. 17 is an enlargement of the gimbal-mounted mirror apparatus 4695 of FIG. 23 and shows a gimbal 2310, the scanning micro-mirror 4820, a micro-mirror suspension element 2330, the electro-static actuator 4530 and the electro-static sensor 4540. The comb drive of FIG. 25 defines the interface between the gimbal 2310 and the mirror 4820. In FIG. 25, reference numeral 4860 denotes an insulating layer and reference numeral 4870 denotes an air gap. The air gap 4870 is shown in FIG. 11.

Figure 26:
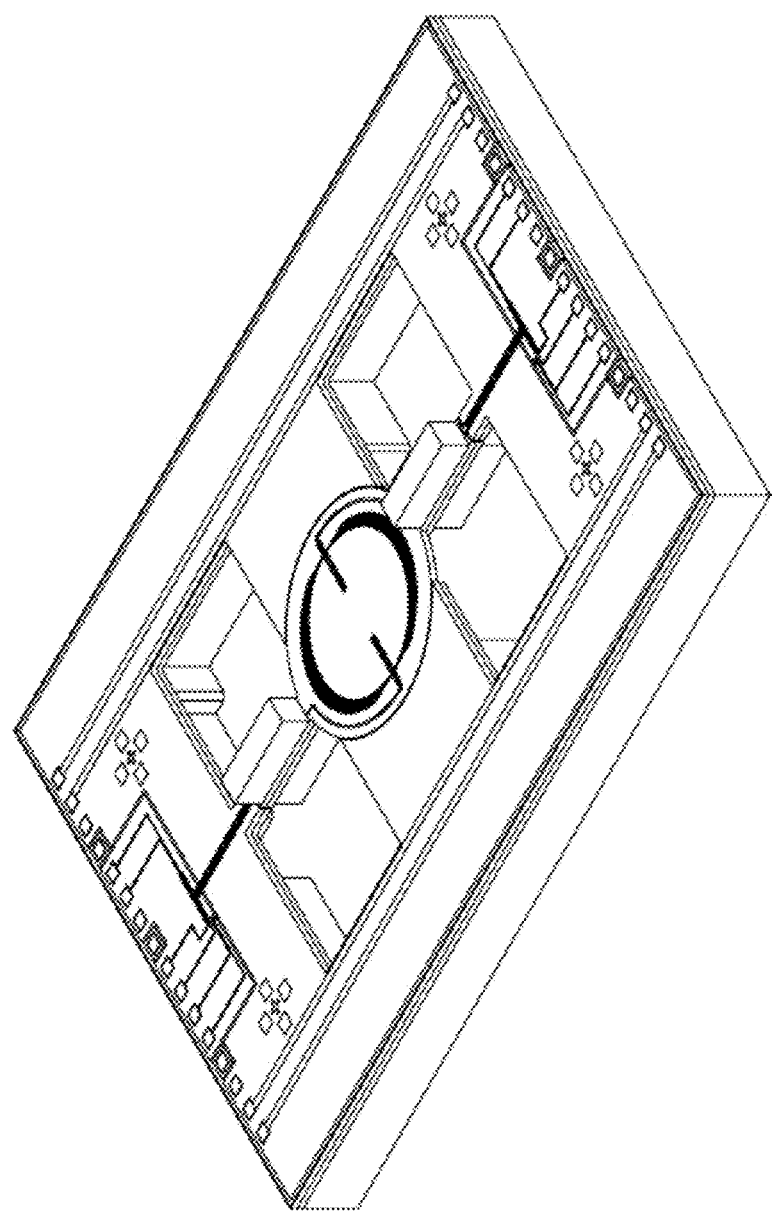
FIGS. 26, 27A-27B, and 28-31 illustrate optional modifications of the embodiments of FIGS. 5, 13, 16, 22, 23, 24A respectively.

FIG. 26 is similar to FIG. 5 except that electromagnetic actuators 530 are omitted. Gimbaled subsystem 500 also includes an annular element 525, which also serves as the stator of electrostatic actuator 520, and which can move about axis 532 without actuation by the omitted actuators. Magnets 534 are positioned adjacent to axis 532.

Referring again to FIG. 7, electromagnetic actuation need not be provided by electromagnetic actuator 530. Any suitable electromagnetic actuator may be used which has a symmetrical structure and hence the actuating force produced creates only a rotational movement of annular element 525 about axis 532, with no excitation of the inner element with mirror 510 The electromagnetic actuator typically provides a linear electromechanical response. The electromagnet actuation typically actuates outer, annular element 525 of gimbaled subsystem 500, providing the scan across the vertical axis, which is done at a relative low frequency, typically a few tens of Hz. The design of electromagnetic actuation facilitates a planar assembly of micro-mirror 510.

Reference is made again to FIG. 9 which illustrates the comb structure of electrostatic actuator 520, including the multiple teeth of rotor 521 and respective multiple teeth of stator 523. The electromagnet actuation actuates outer annular element 525 of gimbaled subsystem 500, providing the scan across the vertical axis, which is done at a relative lower frequency, typically a few tens of Hz. There is little or no mechanical coupling of the two degrees of freedom, i.e. electrostatic actuator 520 actuates only the inner element of gimbaled subsystem 500, and electromagnet actuation actuates only the outer, annular element 525 of gimbaled subsystem 500.

Figure 27A:
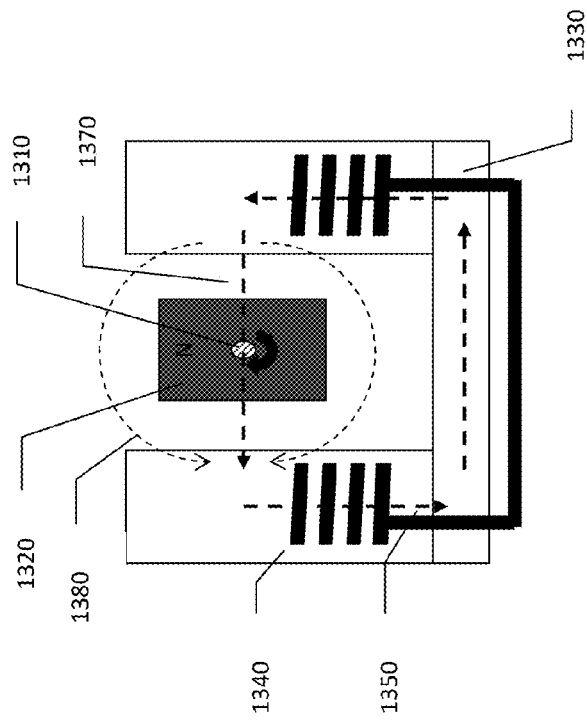
Figure 27B:
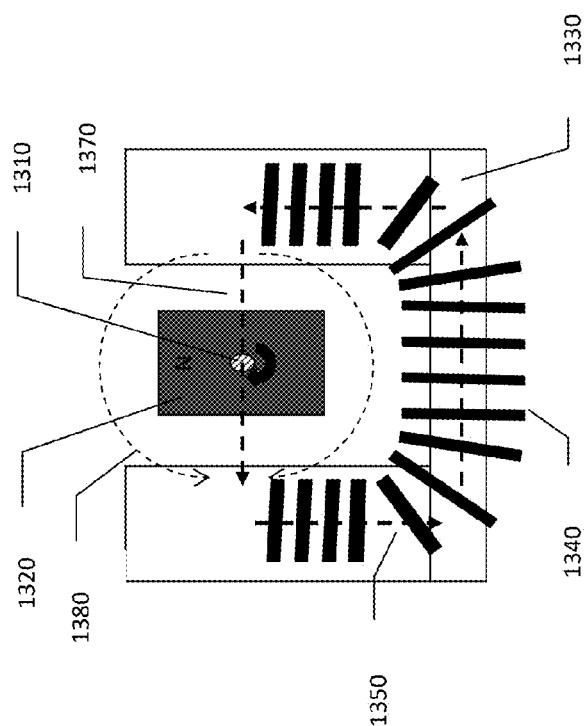

Reference is now made to FIGS. 27A-27B which are simplified cross-sectional illustration of an electro-magnetic actuator constructed and operative according to two respective embodiments of the present invention. In FIGS. 27A-27B, unlike in FIG. 13, it is no longer the case that conductive coils 1340 induce flux directors 1360 to direct the electromagnetic flux in the direction of magnet 1320.

Figure 29:
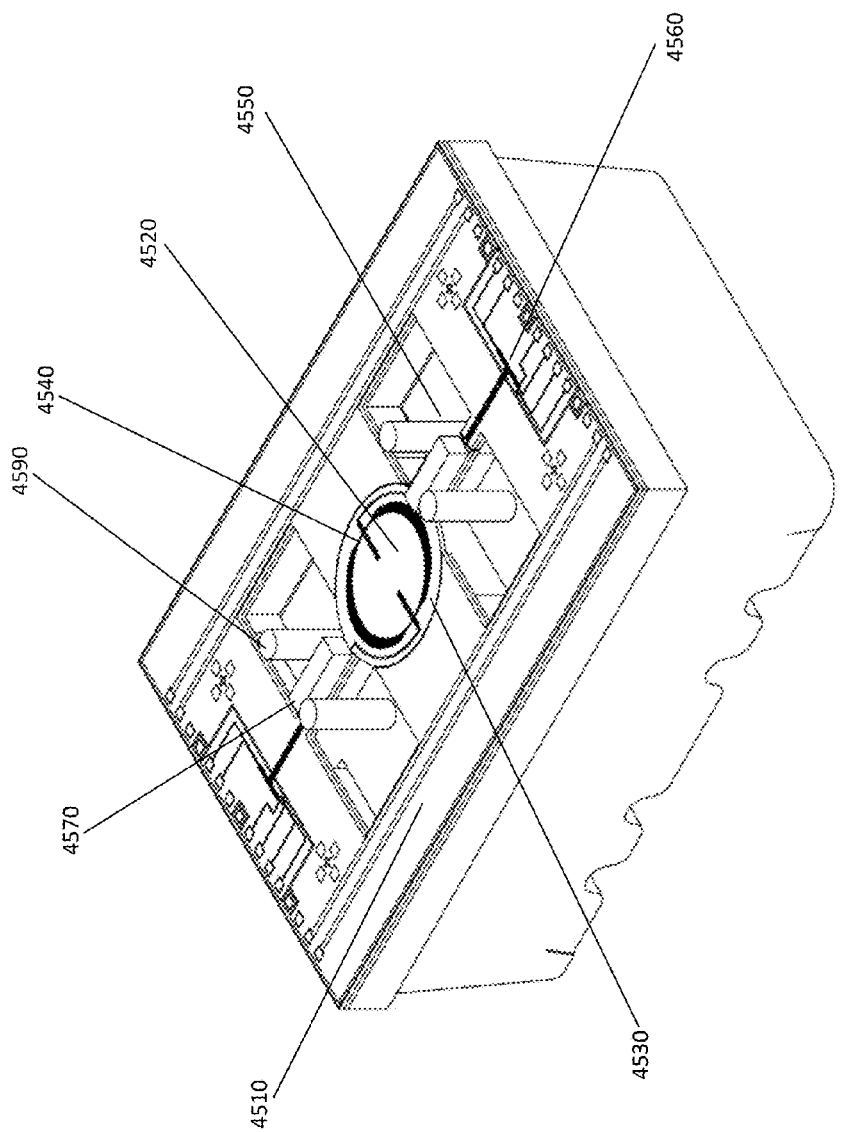

Reference is now made to FIG. 29 which is a perspective view illustration of the system of FIG. 15A, constructed and operative in accordance with certain embodiments of the present invention and similar to the apparatus of FIG. 22 except that flux director 580 is omitted.

Figure 28:
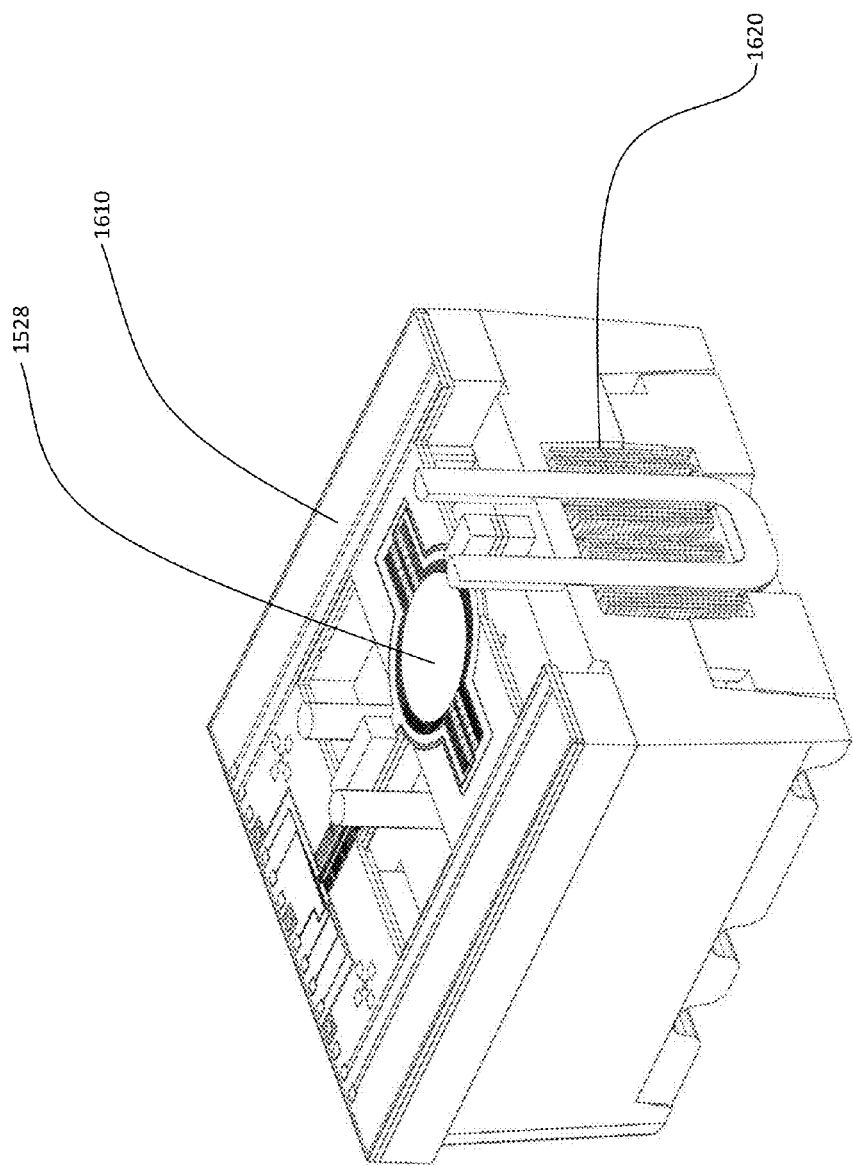

It is appreciated that the apparatus of FIG. 28, is a cut-away drawing of the apparatus of FIG. 29.

Figure 31:
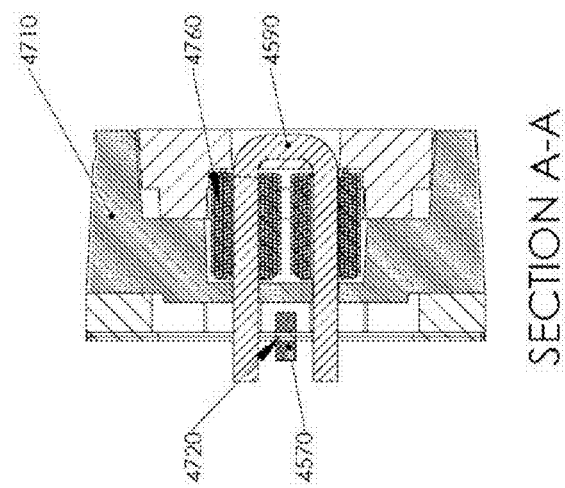
Figure 30:
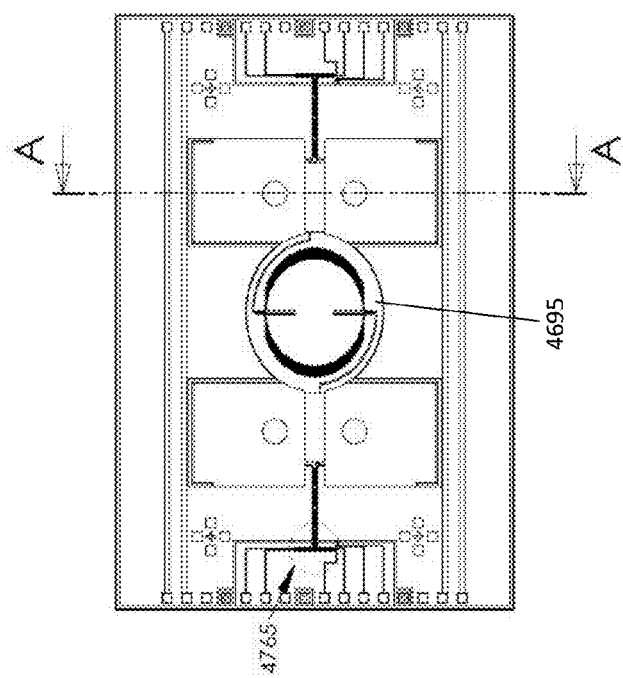

FIG. 30 is a top view illustration of the apparatus of FIG. 29 and FIG. 31 is a cross-sectional illustration taken along the line A-A of FIG. 30. Shown in FIG. 31 are the housing 4710 of the step motor 4550, the axis of rotation 4720 of the rotor of the step motor 4550, and the coil 4760 surrounding the core 4590, all of which may be as described in detail above with reference to FIG. 13. Also shown is gimbal-mounted mirror apparatus 4695, whose structure is best appreciated with reference to FIGS. 17 and 25.

Referring back to FIGS. 27A and 27B, it is appreciated that coil 1340 in FIG. 27A may be replaced by two electrically connected coils wound about the two arms of the U-shaped core 1330 respectively, as shown in FIG. 27B. According to the embodiments, the coils of electromagnets 536 in FIG. 7 may in fact comprise a single coil as in FIG. 27A or a pair of electrically connected coil segments as in FIG. 27B.

A particular feature of certain embodiments of the present invention is a comb drive structure, e.g. as shown in FIG. 9, including first and second mutually engaged toothed structures, the first toothed structure being formed of silicon and functioning as a rotor and the second toothed structure being formed of silicon with a isolated conductive e.g. metal coating thereupon and functioning as a stator. The silicon portions of the two toothed structures are typically formed of a single silicon layer e.g. as described herein with reference to FIG. 12A.

It is appreciated that the particular details of implementation and parameters may be determined by the ordinarily skilled man of the art as appropriate for each application. For example, the space between teeth and configuration thereof in the comb drive structure may be as appropriate, for example, the teeth may be rectangular in cross-section with a space of 2-3 um therebetween. The thickness of various layers of material used to fabricate the various MEMS structures shown and described herein may be as appropriate e.g. some thousands of angstroms for the layers shown and described in FIG. 10. Conventional methods may be used such as layer deposition and silicon deep etch methods. Conventional materials may be used, such as silicon nitride and oxide as isolators and aluminum or Cr/Au as conductive layers. The extent to which the rotating mirror shown and described herein pivots can also be determined by the ordinarily skilled man of the art as appropriate for each application and may for example range from 3 degrees to 12 degrees. Real time computation, e.g. for implementation of the 2 feedback loops of FIG. 15A, may be implemented using suitable technology such as FPGA/CPU programming.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting.

While the invention has been described with respect to a limited number of embodiments, it will be appreciated that many variations, modifications and other applications of the invention may be made.

The invention claimed is:

1. A micro-electro-mechanical device for actuating a gimbaled element for two-dimensional optical scanning, the device comprising:
   a. an electro-magnetically activated gimbal operative for electro-magnetically driven rotation about a first axis in accordance with a step-wave shaped input signal;
   b. a mirror mounted on said gimbal and operative for electro-statically driven rotation about a second axis, thereby defining two degrees of freedom of motion for said mirror, the mirror comprising at least one rotor electrode and the gimbal comprising at least one stator electrode, where the rotor and stator electrode/s together comprise an electro-static comb-drive and both include respective coplanar portions both manufactured in a single process from a single Si layer, wherein an electrical potential difference between top surfaces of the rotor and stator electrodes is created by fringing fields of electro-static force therebetween causing the rotor electrode/s to rotate about its/their axis; and
   c. a mirror motion feedback control loop including:
      i. at least one MEMS motor driver clocked by a clock signal and operative to drive the mirror to resonate along the second axis with an actuation frequency, and wherein the gimbal's orientation follows said step-wave shaped input signal; and
      ii. said electro-static comb-drive which acts as a frequency sensor which is operative:
         to sense the resonance frequency of the mirror which due to said electro-statically driven rotation generates a varying capacitance signal according to which said actuation frequency is set to match said resonance frequency and
         to set said clock signal to the resonance frequency.

2. The device of claim 1, wherein the electro-magnetic actuator has a symmetric structure configured to ensure that actuating forces produced by the electro-magnetic actuator create only rotational motion of the first degree of freedom about the second axis.

3. The device of claim 2, wherein the electro-magnetic actuator, excites negligible residual actuation force on the second degree of freedom.

4. The device of claim 1, thereby providing:
   an electro-magnetic actuator for providing a first angular degree of freedom (DOF) of rotation of said mirror about the first axis, by actuating said gimbal; and
   an electro-static actuator for providing a second angular degree of freedom of rotation of said mirror about the second axis which does not coincide with said first axis by actuating said mirror,
   wherein the electro-static actuator has a symmetric structure, configured to ensure that actuating forces produced by the electro-static actuator create only a rotational movement of the second degree of freedom about the second axis.

5. The device of claim 4, wherein the electro-static actuator excites negligible residual actuation force on the first degree of freedom.

6. The device of claim 1, wherein the electro-static actuator comprises a structural portion having two sides, and wherein there is no electrical potential difference between the two sides of the structural portion of the electro-static actuator.

7. The device of claim 1, wherein the electro-magnetic actuator comprises:
   (a) at least one external fixed electromagnet coil; and
   (b) an internal rotating magnet.

8. The device of claim 7, wherein the rotating magnet is affixed to the first axis and actuated by the electromagnet coil.

9. The device of claim 7, wherein the at least one electromagnetic coil comprises at least a pair of electro-magnetic coils disposed on both sides of the first axis.

10. The device of claim 1, wherein the electro-static actuator actuates the second degree of freedom in a scan direction along said second axis.

11. The device of claim 1, wherein the electro-magnetic actuator actuates the first degree of freedom in a scan direction along said first axis.

12. The device of claim 2, wherein the electro-magnetic actuator has a linear electromechanical response.

13. The device of claim 1, wherein the electro-static actuator has a sinusoidal electromechanical response.

14. The device of claim 1, wherein the electro-static actuator comprises a frequency sensor with high signal to noise ratio.

15. A device according to claim 1, wherein one of said electrodes includes first and second mutually isolated layers of material having an electrical potential difference therebetween, and the other of said electrodes includes a third layer of material, and wherein said electrical potential difference is generated by said second and third layers of material being held at the same electrical potential.

16. A device according to claim 1 wherein said electrical potential difference is created by depositing another conductive layer atop just one of said respective coplanar portions and charging said layer relative to said coplanar portions thereby to yield a potential difference between top-most surfaces of said electrodes.

17. A device according to claim 1 wherein due to said mirror's rotation about the second axis and said electrical potential difference, said varying capacitance signal is created between rotor and stator top surfaces and wherein said frequency sensor comprises a capacitance sensor which measures said varying capacitance signal, thereby to generate an output signal having a frequency and wherein said frequency is derived by a PLL and sent to the MEMS motor driver.

\* \* \* \* \*